(12) United States Patent
Kubouchi et al.

(10) Patent No.: US 7,575,148 B2
(45) Date of Patent: Aug. 18, 2009

(54) MULTILAYER CAPACITOR AND METHOD FOR MANUFACTURING MULTILAYER CAPACITOR

(75) Inventors: Tatsuo Kubouchi, Ome (JP); Hitoshi Iwasaki, Ome (JP); Makoto Shimizu, Ome (JP)

(73) Assignee: Nippon Chemi-Con Corporation, Tokyo (JP)

( * ) Notice: Subject to any disclaimer, the term of this patent is extended or adjusted under 35 U.S.C. 154(b) by 492 days.

(21) Appl. No.: 10/549,878

(22) PCT Filed: Mar. 19, 2004

(86) PCT No.: PCT/JP2004/003747

§ 371 (c)(1),
(2), (4) Date: May 15, 2006

(87) PCT Pub. No.: WO2004/084244

PCT Pub. Date: Sep. 30, 2004

(65) Prior Publication Data

US 2007/0029368 A1    Feb. 8, 2007

(30) Foreign Application Priority Data

Mar. 19, 2003  (JP) ............................. 2003-075727
Sep. 26, 2003  (JP) ............................. 2003-336294

(51) Int. Cl.
*B23K 20/12*    (2006.01)

(52) U.S. Cl. .................. 228/112.1; 228/2.1; 228/179.1; 29/25.41; 29/592.1; 29/825; 29/830

(58) Field of Classification Search ................ 228/2.1, 228/112.1; 29/25.41, 592.1, 825, 830
See application file for complete search history.

(56) References Cited

U.S. PATENT DOCUMENTS 3,264,709 A * 8/1966 Lupfer ...................... 29/25.42

FOREIGN PATENT DOCUMENTS

| JP | 59-123220 | | 7/1984 |
| JP | 04-154106 | | 5/1992 |
| JP | 10-137952 | | 5/1998 |
| JP | 2003-126972 | * | 5/2003 |
| JP | 2004-79769 | * | 3/2004 |

* cited by examiner

*Primary Examiner*—Stanley Silverman
*Assistant Examiner*—Nicholas P D'Aniello
(74) *Attorney, Agent, or Firm*—Chapman and Cutler LLP

(57) ABSTRACT

A plurality of anode foils (7) and a plurality of cathode foils (8) respectively having connecting portions (12a, 12b) are alternately arranged with insulating separators (9) interposed therebetween. The connecting portions (12a, 12b) of the stacked electrode foils (7, 8) are respectively connected and united electrically and mechanically by friction stir welding, thereby forming a capacitor element (5). The capacitor element (5) is housed in a case (2), and the connecting portions (12a, 12b) are respectively connected to a positive electrode external terminal (4) and a negative electrode external terminal (4).

20 Claims, 13 Drawing Sheets (a)

(b)

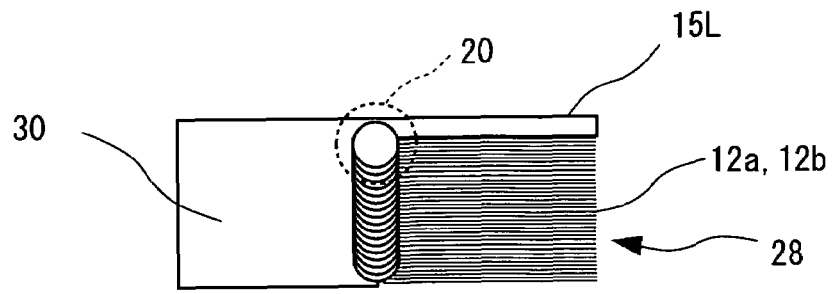
Fig. 16
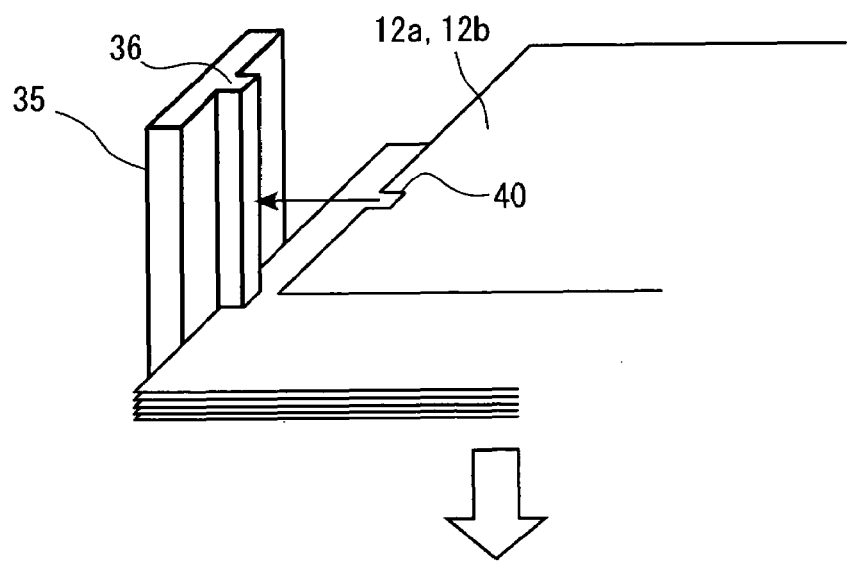
Fig. 17
(a)
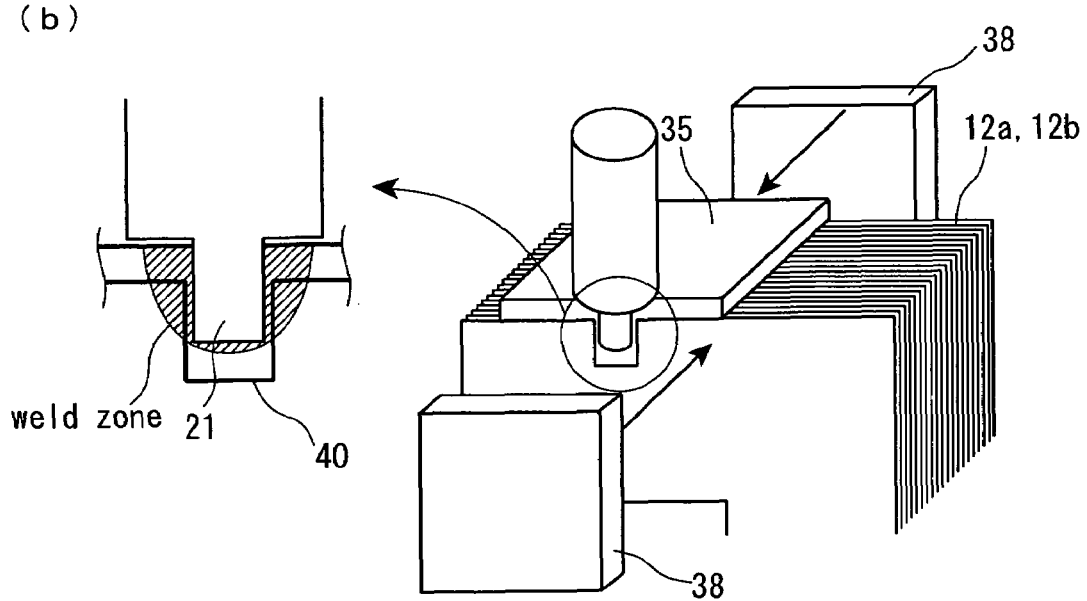
(b)

MULTILAYER CAPACITOR AND METHOD FOR MANUFACTURING MULTILAYER CAPACITOR

BACKGROUND OF THE INVENTION (1) Field of the Invention

The present invention relates to a multilayer capacitor housing a capacitor element in an outer case, the capacitor element being comprised of a plurality of metal foils alternately stacked with electrically insulating separators interposed therebetween, the metal foils partly comprising connecting portions, and connecting the above-mentioned connecting portions respectively to a positive electrode external terminal and a negative electrode external terminal, and a method for manufacturing the multilayer capacitor.

(2) Related Art Statement

A multilayer capacitor using the electrolytic capacitor element formed by stacking or coiling the anode foil, where a metal foil made of valve metal such as aluminum is processed with surface enlargement for increasing its surface area and an oxide layer, which is a dielectric layer, is formed by anode oxidation, and the cathode foil, where a metal foil made of the above-mentioned valve metal such as aluminum is processed only with the above-mentioned surface enlargement, with an electrolytic paper interposed therebetween as the above-mentioned electrically insulating separator, the electrolytic paper being impregnated with an electrolyte, or a multilayer capacitor using the electric double layer capacitor element formed by stacking or coiling the paired polarizable electrode foils of an anode and cathode made by forming activated charcoal layers on both sides of a metal foil made of valve metal such as aluminum, with an electrolytic paper interposed therebetween as the electrically insulating separator, the electrolytic paper being impregnated with an electrolyte, have been conventionally known as the multilayer capacitor. The multilayer capacitors using such capacitor elements are made to be multilayer electrolytic capacitors by bundling together and stacking successively a plurality of connecting portions for each electrode, the connecting portion being protrudingly formed in the circumference of each electrode foil, connecting each bundled and stacked connecting portion to form a capacitor element, housing said capacitor element in an outer case, and sealing an aperture with a sealing material (Patent Document 1).

[Patent Document 1]

Patent Application Unexamined Publication No.H04-154106

For the multilayer electrolytic capacitors using the capacitor elements, it is necessary to electromechanically connect and combine each connecting portion protrudingly formed in the circumference of each metal foil. Stitch welding or ultrasonic welding is mainly used as the above method.

The stitch used for such stitch welding method must be increased in size in proportion as the number of stacked layers increases and the thickness of the stacked layers becomes thick. Thus, this method is not suitable for the case of connecting a plurality of connecting portions.

In addition, for the ultrasonic welding, etched layers for surface enlargement are formed on the surfaces of the anode and cathode foils stacked or coiled, or the oxide layer formed by a formation process is formed on the anode foil as stated above. Because carrying out masking treatment or the like so as not to form the etched layers or oxide layers only on the above-mentioned connecting portions complicates its process, the etched layers or oxide layers are formed on those connecting portions as well for the purpose of simplifying the process. In order to weld each aluminum that is the base metal of each connecting portion over the etched layers and oxide layers formed on the surfaces of both connecting portions to be connected, it becomes necessary to give a bigger ultrasonic vibration. Thus, if a big ultrasonic vibration is given to connect all the connecting portions in a good condition including the bottom of the successively stacked connecting portions, there may occur a problem that the top of the successively stacked connecting portions is ruptured due to the applied big ultrasonic vibration. Alternatively, if the applied ultrasonic vibration is controlled so as not to generate the rupture, the bottom of the successively stacked connecting portions can not be connected in a good condition.

Also, when metal foils comprising polarizable electrode layers made primarily of activated charcoal or carbon on their surfaces instead of the above-mentioned oxide layers formed by the formation process are connected, the same problem as above may occur.

Also, this ultrasonic welding may be carried out on the above-mentioned connecting portions where the etched layers or oxide layers are not formed by carrying out the masking treatment or the like. In this case, although the connecting portions are connected in a better condition compared with the ones comprising the etched layers and oxide layers, a boundary layer remains between the metal foils, each of which is the connecting portion, and said metal foils are easily broken away from their interface. Thus, the connection strength is not enough.

Accordingly, the present invention focuses on the above described problems, and intends to provide a multilayer capacitor capable of connecting the above-mentioned connecting portions in a good condition regardless of the etched layers, oxide layers, and polarizable electrode layers.

SUMMARY OF THE INVENTION

In order to solve the above objects, the method for manufacturing multilayer capacitor of claim 1 of the present invention comprising: a capacitor element housed in an outer case, the capacitor element being comprised of a plurality of metal foils alternately stacked with electrically insulating separators interposed therebetween, the metal foils partly comprising connecting portions; and the above-mentioned connecting portions connected respectively to a positive electrode external terminal and a negative electrode external terminal; comprises the step of: electromechanically connecting and combining each connecting portion of each stacked metal foil by friction stir welding.

In accordance with the above characteristic, the above-mentioned connecting portions are connected and combined by the friction stir welding to destroy etched layers or oxide layers by the rotation of a probe in the friction stir welding even if said connecting portions comprise the etched layers or the oxide layers on their surfaces. Then, base metals are melted to be combined. As a result, the multilayer capacitor comprising the above-mentioned connecting portions electromechanically connected in a good condition can be obtained regardless of the etched layers or oxide layers.

The method for manufacturing multilayer capacitor of claim 2 of the present invention is based on the method for manufacturing multilayer capacitor of claim 1, wherein a reinforcing base material is placed at least at one side of each of the stacked connecting portions to carry out the above-mentioned friction stir welding of the connecting portions.

In accordance with the above characteristic, the stacked connecting portions are carried by or sandwiched between said reinforcing base material in the above-mentioned friction stir welding. Thus, performance of the friction stir welding can be improved while the above-mentioned reinforcing base material is integrated with the connecting portions to obtain a solid connection.

The method for manufacturing multilayer capacitor of claim 3 of the present invention is based on the method for manufacturing multilayer capacitor of claim 1 or 2, wherein the above-mentioned reinforcing base material works as an internal electrode.

In accordance with the above characteristic, it is not necessary to separately connect the internal electrode to the connecting portions. Thus, the number of components can be decreased while the process can be simplified.

The method for manufacturing multilayer capacitor of claim 4 of the present invention is based on the method for manufacturing multilayer capacitor of any one of claims 1 to 3, wherein the above-mentioned friction stir welding is carried out from the side where the above-mentioned reinforcing base material is placed.

In accordance with the above characteristic, because the above-mentioned reinforcing base material exists between the stacked connecting portions and a rotating stir rod for carrying out the friction stir welding, a problem caused by transformation or rupture of the top metal foil of the stacked connecting portions by the rotation of a probe when the probe is press-fitted can be significantly decreased.

The method for manufacturing multilayer capacitor of claim 5 of the present invention is based on the method for manufacturing multilayer capacitor of any one of claims 2 to 4, wherein the same metal material as the above-mentioned metal foils is used as the above-mentioned reinforcing base material.

In accordance with the above characteristic, a problem of metal diffusion or the like by the formation of alloy by welding or the like can be avoided. A problem of corrosion or the like by the formation of cell between different metals or the like can be also avoided.

The method for manufacturing multilayer capacitor of claim 6 of the present invention is based on the method for manufacturing multilayer capacitor of any one of claims 1 to 5, wherein a welding base material made of the same metal as the above-mentioned metal foils and having almost the same thickness as or being thicker than multilayer bodies formed by stacking the metal foils comprising the above-mentioned connecting portions is positioned adjacent to at least one part of the stacking side face of each of said multilayer bodies, and at least one part of the boundary between said welding base material and the above-mentioned multilayer body is stirred by the rotating probe to form a weld zone.

In accordance with the above characteristic, the connecting portion of each metal foil stacked in the above-mentioned multilayer body is welded with the welding base material by the friction stir welding. By this, the welding base material is stirred to be fed into the multilayer body well. As a result, the amount of the oxide layer relatively decreases at the weld zone of the multilayer body. Each metal foil becomes solid and has a higher melting point because the welding base material and each metal foil, and each of the metal foils are electromechanically connected. When each metal foil is formed thick for the purpose of enduring the withstand voltage of an electrolytic capacitor, negative effects of a defect or the like generated by the oxide layer formed by a formation process or the like, the oxide layer tending to remain segmented into chips without being melted even by the rotation of the probe, can be significantly decreased. Thus, more stable electromechanical connection can be obtained. In addition, the amount of the oxide layer formed by the formation process or the like decreases at the weld zone to thereby decrease probe head wear. Thus, it is possible to prevent the process from being complicated and the production cost from increasing with replacement of the probe due to wear. In addition, because the press-fitting area of the probe into the multilayer body itself around the connecting portions of metal foils to be welded is small, damage by excess transformation or destruction of the metal foils near said connecting portions can be decreased The method for manufacturing multilayer capacitor of claim 7 of the present invention is based on the method for manufacturing multilayer capacitor of claim 6, wherein the above-mentioned probe is press-fitted into the boundary between the above-mentioned welding base material and the above-mentioned multilayer body, or the vicinity of said boundary, along the boundary face.

In accordance with the above characteristic, the cylindrical probe rotates to convey its stirring force effectively to a rotating direction. Thus, the probe is press-fitted into the boundary between the above-mentioned welding base material and multilayer body, or the vicinity of said boundary, along said boundary face, to position the above-mentioned welding base material and multilayer body adjacent to each other via the probe. As a result, a sufficient amount of welding base material not comprising the oxide layers, which is stirred and melted by the rotation of the cylindrical probe, is fed into the multilayer body well. Thus, the negative effects of the defect or the like generated by the oxide layers formed by the formation process can be significantly decreased, and a solid connection can be obtained. Then, more stable electromechanical connection can be obtained.

The method for manufacturing multilayer capacitor of claim 8 of the present invention is based on the method for manufacturing multilayer capacitor of claim 6 or 7, wherein the above-mentioned welding base material comprises at least an almost homogeneous block body made of the same metal as the metal foils stacked in the multilayer body.

In accordance with the above characteristic, the welding base material is the block body, which is almost homogeneous in the stacking direction of the multilayer body and therefore has good heat conductivity. Thus, the friction heat generated by friction with the probe in the friction stir welding is well transferred to the bottom side of the weld zone. This enables prevention of a variation in the welding quality due to defective heat transfer. At the same time, because non welded block body adjacent to the weld zone, which is almost homogeneous in the stacking direction of the multilayer body, remains, good heat conductivity or electrical conductivity can be obtained via this non welded block body.

The method for manufacturing multilayer capacitor of claim 9 of the present invention is based on the method for manufacturing multilayer capacitor of any one of claims 6 to 8, wherein the above-mentioned welding base material comprises at least a multilayer body of metal foils not comprising the oxide layers formed by the formation process on their surfaces.

In accordance with the above characteristic, the number of the stacked metal foils is adjusted to easily obtain the welding base material of the same height as the multilayer body.

The method for manufacturing multilayer capacitor of claim 10 of the present invention is based on the method for manufacturing multilayer capacitor of any one of claims 6 to 9, wherein the above-mentioned welding base material is positioned adjacent to a cut-away part formed in the circumference of the above-mentioned multilayer body, or the internal surface of a hole penetrated in the stacking direction such that almost all the metal foils stacked in the multilayer body are penetrated.

In accordance with the above characteristic, because the welding base material is positioned adjacent to the cut-away part or the internal surface of the hole, the welding base material and the multilayer body are well affixed and adherent to each other even in press-fitting the probe, and it becomes possible to prevent misalignment of these welding base material and multilayer body. Thus, the performance of the friction stir welding can be improved while said metal foils are sequentially stacked aligning their cut-away parts with the welding base material to decrease the multilayer misalignment of the metal foils. Furthermore, even when the metal foils are misaligned in stacking, the metal foils can be abutted to one of the opposing faces of the welding base material to carry out more reliable welding. Thus, the multilayer misalignment of the metal foils in the stacking process can be allowed, and the defect generated by this multilayer misalignment can be reduced.

The method for manufacturing multilayer capacitor of claim 11 of the present invention is based on the method for manufacturing multilayer capacitor of claim 10, wherein the above-mentioned probe is shaped such that said probe rotates to weld at least one part of the opposing boundaries out of the boundaries between the above-mentioned welding base material positioned adjacent to the cut-away part or the internal surface of the hole, and the above-mentioned multilayer body, at the same time.

In accordance with the above characteristic, the opposing boundaries can be welded by the press-fitting of the probe at the same time. As a result, the time required for welding can be reduced and the method for manufacturing can be simplified. Furthermore, because opposing plurality of faces are welded, the connection strength can be increased. Therefore, it is possible to achieve downsizing and decrease electric resistance at the connecting portions.

The method for manufacturing multilayer capacitor of claim 12 of the present invention is based on the method for manufacturing multilayer capacitor of any one of claims 6 to 11, wherein the above-mentioned multilayer body is positioned adjacent to the internal surface of a cut-away part formed at the above-mentioned welding base material.

In accordance with the above characteristic, the welding base material and the multilayer body are well affixed and adherent to each other even in press-fitting the probe, and it becomes possible to prevent misalignment of these welding base material and multilayer body. Thus, the performance of the friction stir welding can be improved while the metal foils are sequentially stacked being aligned with the above-mentioned cut-away part of the welding base material to decrease the multilayer misalignment of the metal foils. Furthermore, even when the metal foils are misaligned in stacking, the metal foils can be abutted to one of the opposing faces of the cut-away part formed at the above-mentioned welding base material to carry out more reliable welding. Thus, the multilayer misalignment in the stacking process can be allowed, and the defect generated by the multilayer misalignment can be reduced. Moreover, by applying the above-mentioned cut-away part formed in the circumference of the above-mentioned multilayer body as well, the welding base material and the multilayer body can be better affixed and adherent to each other.

The method for manufacturing multilayer capacitor of claim 13 of the present invention is based on the method for manufacturing multilayer capacitor of any one of claims 6 to 12, wherein the above-mentioned probe is press-fitted such that the weld zone welded by the above-mentioned probe is formed more in the welding base material side.

In accordance with the above characteristic, the absolute amount of the oxide layer within the weld zone can be further decreased, and the defect generated by the existence of the oxide layer can be further reduced. Moreover, mechanical stress on the multilayer body in welding can be decreased as well, and also, defective welding caused by this mechanical stress can be decreased.

The method for manufacturing multilayer capacitor of claim 14 of the present invention is based on the method for manufacturing multilayer capacitor of any one of claims 6 to 13, wherein the above-mentioned probe is press-fitted into almost the same direction as the stacking direction of the multilayer body.

In accordance with the above characteristic, when the number of metal foils stacked in the above-mentioned multilayer body is small, for example, said multilayer body and welding base material can be integrated only by press-fitting the probe.

The method for manufacturing multilayer capacitor of claim 15 of the present invention is based on the method for manufacturing multilayer capacitor of any one of claims 6 to 13, wherein the above-mentioned probe is press-fitted into the direction almost perpendicular to the stacking direction of the above-mentioned multilayer body.

In accordance with the above characteristic, the friction stir welding can be carried out at the bottom of the probe which can weld over a wide area and form a stable weld zone. Also, the connecting portion of each metal foil stacked in the multilayer body can be likewise welded by this bottom of the probe, and the friction stir welding can be carried out with almost the same relative position of the press-fitting position of the probe against each connecting portion of the multilayer body. Thus, the welding quality (welding condition) of each metal foil stacked in the multilayer body can be equalized by avoiding the variation in the welding quality (welding condition) of each metal foil stacked in the multilayer body due to a difference in the welding quality (welding condition) by a positional difference within the welding probe. Further, the welding area can be reduced by keeping the press-fitting length and diameter of the probe to the minimum necessary to maintain rigidity, and also, the process can be simplified because it is not necessary to change the probe length even if the thickness of the multilayer body is changed.

The method for manufacturing multilayer capacitor of claim 16 of the present invention is based on the method for manufacturing multilayer capacitor of any one of claims 6 to 15, wherein a reinforcing base material made of the same metal as the above-mentioned metal foils and being thicker than the above-mentioned metal foil is positioned abutting the above-mentioned multilayer body, and one part of said reinforcing base material is welded with the multilayer body by the friction stir welding.

In accordance with the above characteristic, the process can be simplified because it is not necessary to weld the reinforcing base material separately. Further, metal not comprising the oxide layer is fed from this reinforcing base material as well to further decrease the absolute amount of the oxide layer within the weld zone. Then, it becomes possible to further reduce the defect generated by the existence of the oxide layer as well as to decrease the probe wear.

The method for manufacturing multilayer capacitor of claim 17 of the present invention is based on the method for manufacturing multilayer capacitor of claim 16, wherein the above-mentioned welding base material and the above-mentioned reinforcing base material are integrated.

In accordance with the above characteristic, by integrating the welding base material and the reinforcing base material, it becomes unnecessary to align or support the welding base material and the reinforcing base material. As a result, the performance of the friction stir welding can be further improved.

The method for manufacturing multilayer capacitor of claim 18 of the present invention is based on the method for manufacturing multilayer capacitor of claim 17, wherein a reinforcing welding base material integrating the above-mentioned welding base material and the above-mentioned reinforcing base material is of an L-shape in a sectional view, or of a U-shape, with at least one side opened, in a sectional view.

In accordance with the above characteristic, because the reinforcing welding base material is opened at least in one direction, said reinforcing welding base material can be easily positioned with the multilayer body while the stacking condition of the multilayer body can be checked even after positioning.

The method for manufacturing multilayer capacitor of claim 19 of the present invention is based on the method for manufacturing multilayer capacitor of any one of claims 6 to 18, wherein a reinforcing base material being thicker than the above-mentioned metal foil is interposed between the one part of the metal foils stacked in the above-mentioned multilayer body.

In accordance with the above characteristic, the metal not comprising the oxide layer is fed from this reinforcing base material as well to further decrease the absolute amount of the oxide layer within the weld zone. Then, it becomes possible to further reduce the defect generated by the existence of the oxide layer, as well as to decrease the probe wear. Moreover, the stacking condition of the metal foils stacked in the above-mentioned multilayer body can be prevented from being destroyed by welding to further improve the performance of the friction stir welding.

The method for manufacturing multilayer capacitor of claim 20 of the present invention is based on the method for manufacturing multilayer capacitor of any one of claims 6 to 19, wherein the above-mentioned metal foils comprise the oxide layers formed by the formation process, or polarizable electrode layers made primarily of activated charcoal or carbon, on their surfaces at least except the surfaces of the above-mentioned connecting portions.

In accordance with the above characteristic, the negative effects on the friction stir welding of the defect or the like generated by the oxide layers formed by the formation process, or the polarizable electrode layers can be decreased to thereby obtain more stable electromechanical connection.

The multilayer capacitor of claim 20 of the present invention is manufactured by using the method for manufacturing multilayer capacitor of any one of claims 1 to 19.

In accordance with the above characteristic, by connecting and combining the above-mentioned connecting portions by the friction stir welding, the etched layers, oxide layers or polarizable electrode layers, even if said connecting portions comprise them on their surfaces, can be destroyed by the rotation of the probe in the friction stir welding, and the base metals are melted to be combined. Therefore, the multilayer capacitor comprising a good electromechanical connection of the above-mentioned connecting portions can be obtained regardless of the etched layers, oxide layers or polarizable electrode layers.

BRIEF DESCRIPTION OF THE DRAWINGS

FIGS. 16 is a view showing another type of friction stir welding in the present invention;

FIGS. 17(a) and (b) are views showing the state of carrying out the friction stir welding in the embodiment 4 of the present invention;

DETAILED DESCRIPTION OF PREFERRED EMBODIMENTS

The embodiments of the present invention are described in the following.

Embodiment 1

Figure 1:
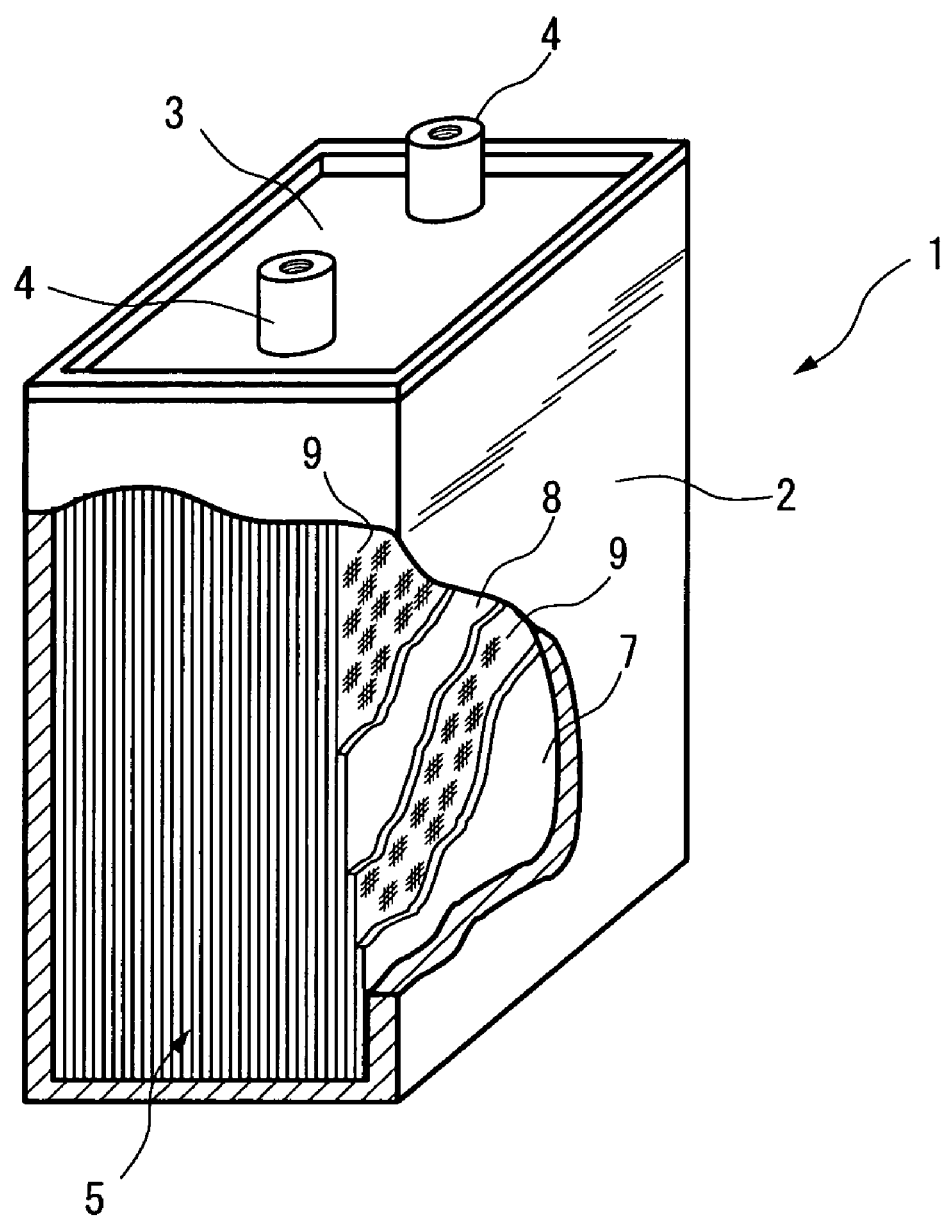
FIG. 1 is a partially broken-out perspective view of the multilayer electrolytic capacitor of the embodiment 1 of the present invention.

The capacitor of the present embodiment has the same appearance as normal capacitors where the aperture of an outer case 2 in the shape of a bottomed square tube, which can house a multilayer capacitor element 5 (hereinafter abbreviated to capacitor element), is sealed by a sealing member 3 with external terminals 4 formed penetrating therethrough as shown in FIG. 1.

Using aluminum as an anode foil 7 and a cathode foil 8 that are used for the above-mentioned capacitor element, the above-mentioned outer case 2 used in the present embodiment is made of aluminum in the shape of a bottomed square tube. Because the present embodiment uses a square-shaped capacitor element, outer case 2 is also in the shape of a sparer tube. However, the present invention is not limited to this, and a cylindrical outer case may be also applied if the capacitor element used here is in the shape of a cylinder stacked by coiling.

In addition, if the capacitor element is thin, an outer case made of a laminate film or the like may be also used.

Figure 2:
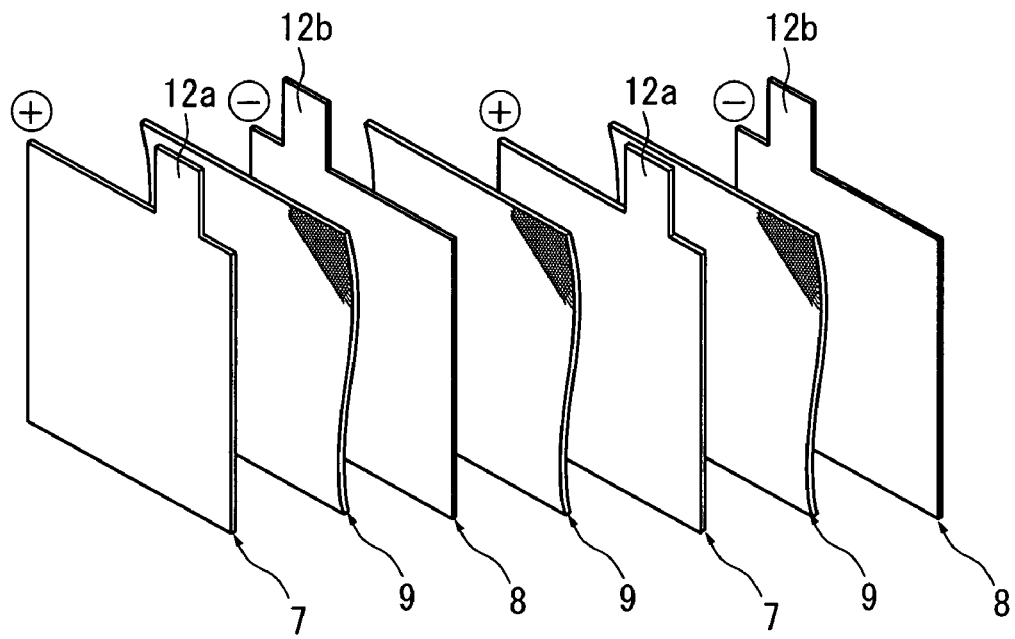
FIG. 2 is a view showing the configuration of the capacitor element used in the embodiment 1 of the present invention.

Capacitor element 5 housed in this outer case 2 is in the shape of a square pole, formed by stacking anode foils 7 that are aluminum foils comprising etched layers formed by an etching treatment that is for surface enlargement, and oxide layers formed by a formation process on their surfaces, and cathode foils 8 comprising etched layers formed by the etching treatment that is for surface enlargement, with electrolytic papers 9, as an electrically insulating separator, interposed between said anode foils 7 and cathode foils 8 as shown in FIG. 2. In addition, a fixing tape that is not shown in the figure is coiled around the side circumference of said stacked capacitor element 5 in order to prevent misalignment after stacking.

Also, said capacitor element 5 is impregnated with a predetermined electrolyte. The above-mentioned electrolytic papers 9 keep the electrolyte, which is made to create a condition of contact between the above-mentioned anode foils 7 and the above-mentioned cathode foils 8. The present embodiment uses 0.1 mm electrolytic paper.

In the present embodiment, the aluminum foil used as anode foils 7 and cathode foils 8, serves as a collector electrode, each of the anode foils 7 having thickness of around 100 μm and each of the cathode foils 8 having thickness of around 50 μm. At the same time, it has appropriate mechanical strength necessary for the above-mentioned stacking or the like. The surfaces of the above-mentioned anode foils 7 are processed with the etching treatment that is for surface enlargement for increasing the surface area, and thereafter, processed with the formation process for forming a homogeneous oxide layer. A lead tab 12a that is a connecting portion is protrudingly formed by punching in the offset position from the center of one side of the circumference of each of anode foils 7. Those lead tabs 12a formed above also comprise the etched layers and the oxide layers. Also, cathode foils 8 are processed with the etching treatment that is for surface enlargement for increasing the surface area. After that, a lead tab 12b that is a connecting portion is protrudingly formed by punching in the offset position from the center of one side of the circumference of each of cathode foils 8. Said lead tabs 12b also comprise the etched layers formed by the etching treatment.

As described above, the present embodiment uses the aluminum foils as anode foils 7 and cathode foils 8. However, the present invention is not limited to this, and tantalum or titanium that is a valve-action metal may be also applied as these anode foils 7 and cathode foils 8.

Anode foils 7 and cathode foils 8 formed by punching as above are stacked in a manner that lead tabs 12a and lead tabs 12b are guided out from one multilayer end face of capacitor element 5 such that lead tabs 12a and lead tabs 12b of anode foils 7 and cathode foils 8 alternately stacked with the above-mentioned electrolytic papers 9 interposed therebetween are in different positions from each other at one multilayer end face of capacitor element 5 as shown in FIG. 2.

Figure 4:
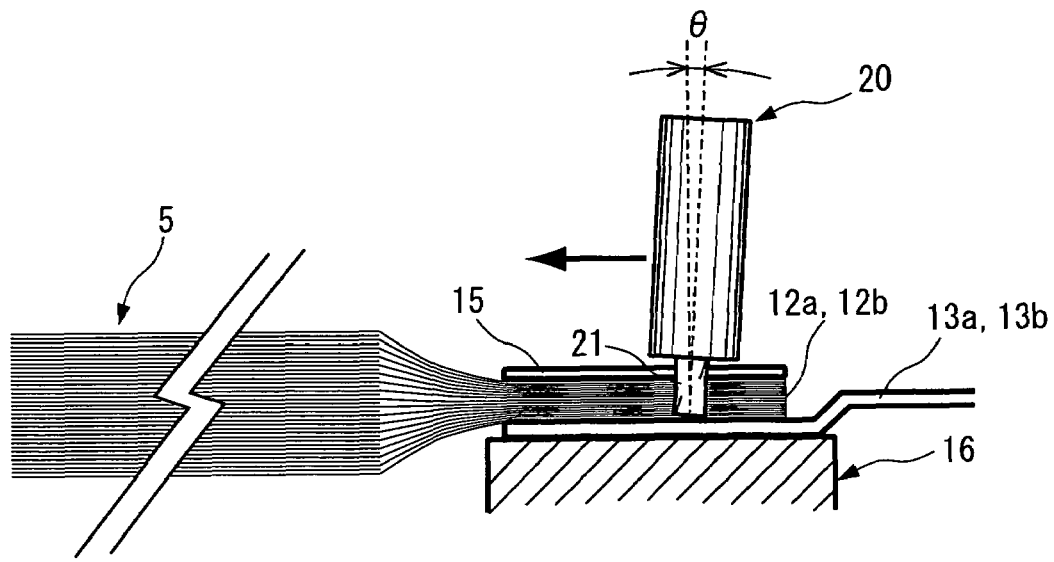
FIG. 4 is a view showing the state of carrying out the friction stir welding in the embodiment 1 of the present invention seen from the side.
Figure 5:
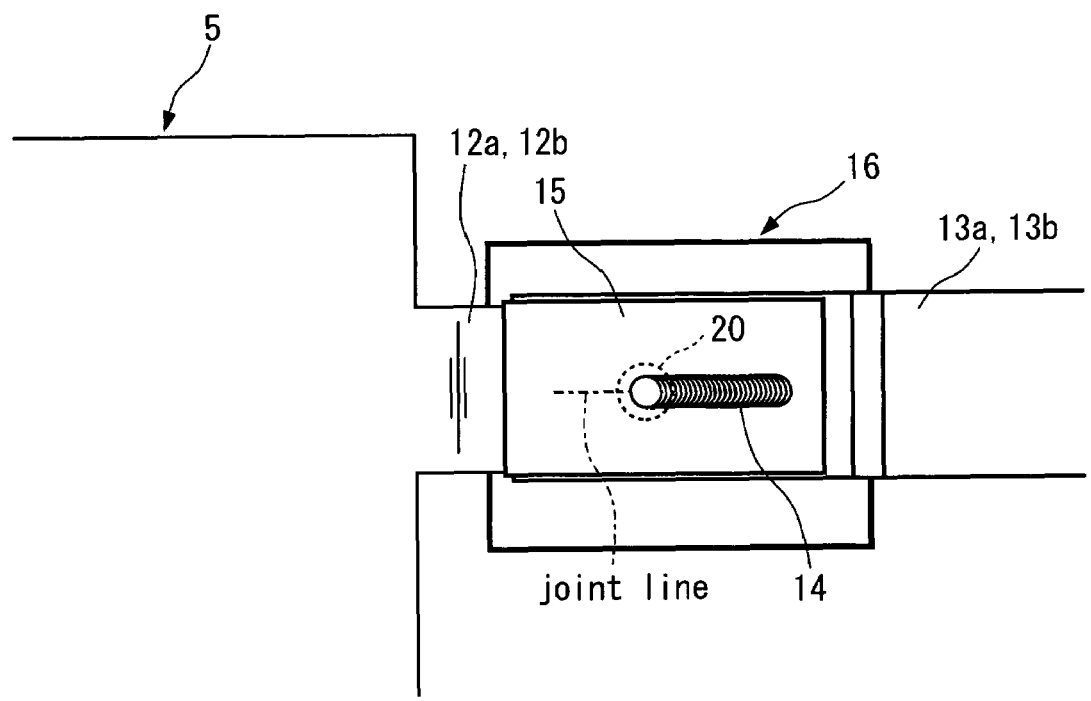
FIG. 5 is a view showing the state of carrying out the friction stir welding in the embodiment 1 of the present invention seen from the above.

Each lead tab 12a of anode foils 7 and each lead tab 12b of cathode foil 8 of the above-mentioned capacitor element 5 formed by stacking are bundled together and stacked with respect to lead tabs 12a and lead tabs 12b. At the same time, as shown in FIG. 4, a reinforcing plate 15 as a reinforcing member and internal electrode 13a or 13b are positioned at both sides of the stacking direction. Lead tabs 12a or lead tabs 12b is sandwiched between said internal electrode 13a or 13b, and said reinforcing plate 15, and fixed by the fixing tape that is not shown in the figure. After that, a probe 21 set at the head of a stir rod 20 rotating from the back side of the above-mentioned reinforcing plate 15 on a processing table 16 is press-fitted into a predetermined depth. Said press-fitted probe 21 is moved along the joint line to carry out friction stir welding as shown in FIG. 5. A connected zone 14 that is to be a weld zone is thereby formed, and reinforcing plate 15, lead tabs 12a or 12b, and internal electrode 13a or 13b are electromechanically jointed. In addition, it is preferable that probe 21 is press-fitted into the reinforcing plate or the internal electrode positioned at the bottom. By this, one part of the reinforcing plate or the internal electrode is jointed with the lead tabs, and therefore connectivity of lead tabs may be improved.

In this friction stir welding, the above-mentioned press-fitted probe 21 rotates to generate friction heat and processing heat between reinforcing plate 15 and lead tabs 12a or 12b. Said friction heat and processing heat increase the temperature of aluminum that is the metal constituting reinforcing plate 15, lead tabs 12a, or 12b, and internal electrode 13a or 13b, to soften the aluminum. At the same time, said softened aluminum by the rotation of said probe 21 is stirred to thereby destroy the oxide layer on its surface. Then, the base metals of the aluminum contact each other in a softened state, and get solidified at the back of said probe 21 with the movement of the probe. Thus, reinforcing plate 15, lead tabs 12a or 12b, and internal electrode 13a or 13b are connected solidly.

It is preferable in this friction stir welding that the above-mentioned stir rod 20 is set with a tilt angle θ of 2 to 5 degrees such that the above-mentioned probe 21 precedes the above-mentioned the above-mentioned stir rod 20. However, any tilt angle may be accordingly selected depending on the thickness of used reinforcing plate 15, the number of connected lead tabs 12a or 12b, the rotation number of stir rod 20, the amount of press-fitting, or the like, as this tilt angle θ.

In addition, the shape of probe 21 or the like may be also accordingly selected depending on the thickness of used reinforcing plate 15, the number of connected lead tabs 12a or 12b, the rotation number of stir rod 20, the amount of press-fitting, or the like.

In addition, the rotation number of stir rod 20, the amount of press-fitting, the movement speed, or the like may be also accordingly selected depending on the thickness of used reinforcing plate 15, the number of connected lead tabs 12a or 12b, or the like.

As a material of these reinforcing plate 15, and internal electrode 13a or 13b, it is preferable to use aluminum that is the same kind of metal as the aluminum used for the above-mentioned anode foils 7, cathode foils 8, and lead tabs 12a or 12b. Here, metal made primarily of aluminum but comprising some different minor constituents may be included in the same kind of aluminum metal. It is preferable to use the same kind of aluminum metal as above on the grounds that it is possible to avoid the problem that good connection strength cannot be obtained because alloy-forming ability against the aluminum used for lead tabs 12a or 12b is not good when a different kind of metal is used as these reinforcing plate 15 (including a block part 30 of a reinforcing plate 15L described hereinafter), and internal electrode 13a or 13b, or the problems of degradation of the connecting portions due to diffusion of aluminum or the different kind of metal into the other metal, or of corrosion of aluminum or the metal used for reinforcing plate 15, and internal electrode 13a or 13b, due to the formation of cell. However, as long as the above-mentioned problems can be avoided, a different kind of metal from the metal used for anode foils 7, cathode foils 8, and lead tabs 12a or 12b may be used as reinforcing plate 15, and internal electrode 13a or 13b.

In addition, if the thickness of these reinforcing plate 15, and internal electrode 13a or 13b becomes less than 0.2 mm, enough strength as a reinforcing base material cannot be obtained. Also, when the friction stir welding is carried out by press-fitting the above-mentioned probe 21 from the back side of the above-mentioned reinforcing plate 15, it is difficult to control the rotational speed, movement speed, angle or the like of stir rod 20, and therefore to carry out stable friction stir welding. On the contrary, if the thickness significantly becomes thick, the friction stir welding needs longer processing time. Thus, the thickness is preferably in the range of 0.2 mm to 1.0 mm.

Figure 3:
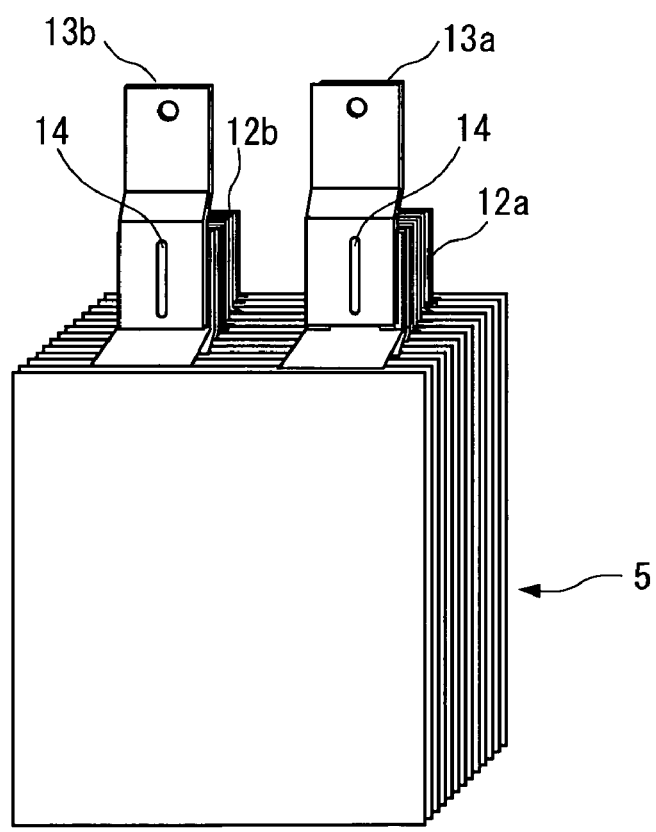
FIG. 3 is an outside perspective view of the capacitor element used in the embodiment 1 of the present invention.

Capacitor element 5 with connected zone 14, as shown in FIG. 3, formed by the friction stir welding by the above means is housed in the above-mentioned outer case 2 while internal electrodes 13a and 13b jointed with lead tabs 12a and 12b by the above-mentioned friction stir welding are respectively connected to external terminals 4, and thereafter, it is made to be a capacitor by hermetically sealing the aperture of said outer case 2 by sealing member 3.

As described above, on the cross section of the joint by the friction stir welding as in the present embodiment 1, aluminum softened by the friction heat and processing heat is stirred, and thereby, the base metals of aluminum contact each other and are solidified. By this, a strong solid phase without any boundary is formed with high joint strength. On the other hand, the interface of each aluminum foil remains having extremely unstable joint strength on the cross section of the joint by conventional ultrasonic bonding. As in the present embodiment 1, even lead tabs 12a that are the connecting portions comprise the etched layers or oxide layers on their surfaces, probe 21 rotates to destroy these etched layers or oxide layers in the friction stir welding, and each aluminum that is the base metal is melted to be combined. Thus, a good connection of the above-mentioned lead tabs 12a that are the connecting portions can be obtained regardless of the etched layers or oxide layers.

Figure 6:
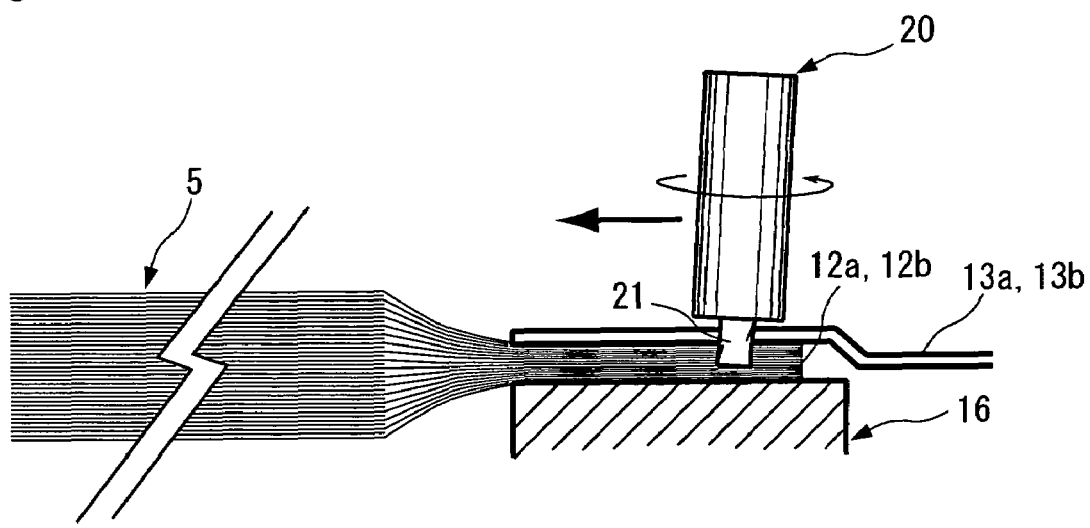
FIG. 6 is a cross-section view of another embodiment of the friction stir welding in the present invention.
Figure 7:
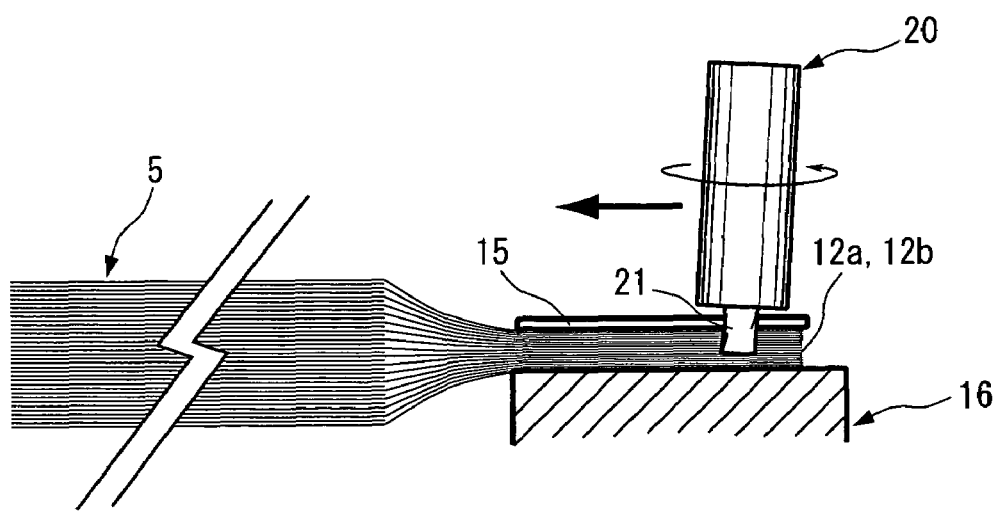
FIG. 7 is a cross-section view of another embodiment of the friction stir welding in the present invention.

In addition, although bundled and stacked lead tabs 12a or 12b are sandwiched between reinforcing plate 15 and internal electrode 13a or 13b in the present embodiment 1, the present invention is not limited to this. For example, only internal electrode 13a or 13b as the reinforcing base material may be positioned on one side of the stacking direction of stacked lead tabs 12a or 12b, and the friction stir welding may be carried out from the back side of said positioned internal electrode 13a or 13b as shown in FIG. 6.

Further, internal electrodes 13a and 13b as the reinforcing base material are jointed with lead tabs 12a and 12b by the friction stir welding, and said internal electrodes 13a and 13b are connected to the above-mentioned external electrodes 4 in the present embodiment 1. This is preferable because it is not necessary to separately connect the internal electrode to the connecting portions, and therefore the number of components can be decreased while the process can be simplified. However, the present invention is not limited to this, and only reinforcing plate 15 may be used as the reinforcing base material, and the internal electrode may be separately connected to said reinforcing plate 15, lead tabs 12a or 12b processed with the friction stir welding.

In addition, reinforcing plate 15, and internal electrode 13a or 13b as the reinforcing base material are used in the present embodiment 1. This is preferable because bundled and stacked lead tabs 12a or 12b that are the connecting portions are carried by or sandwiched between these reinforcing plate 15, and internal electrode 13a or 13b as the reinforcing base material in the above-mentioned friction stir welding to thereby improve performance of the friction stir welding. However, the present invention is not limited to this, and reinforcing plate 15, and internal electrode 13a or 13b as the reinforcing base material may not be used therein depending on the multilayer number of lead tabs 12a or 12b, the thickness of used anode foils 7 and cathode foils 8, or the like.

Embodiment 2

Subsequently, the embodiment using the welding base material of the present invention is explained hereinafter. In addition, other elements or the like than a capacitor element 5' in the present embodiment 2, being the same as the above-mentioned embodiment 1, are not explained.

First, anode foils 7 and cathode foils 8 formed by punching as the above-mentioned embodiment 1 are stacked in a manner that lead tabs 12a and lead tabs 12b are guided out from one multilayer end face of capacitor element 5' such that lead tabs 12a and lead tabs 12b of anode foils 7 and cathode foils 8 alternately stacked with the above-mentioned electrolytic papers 9 interposed therebetween are in different positions from each other as the above-mentioned embodiment 1.

Figure 8:
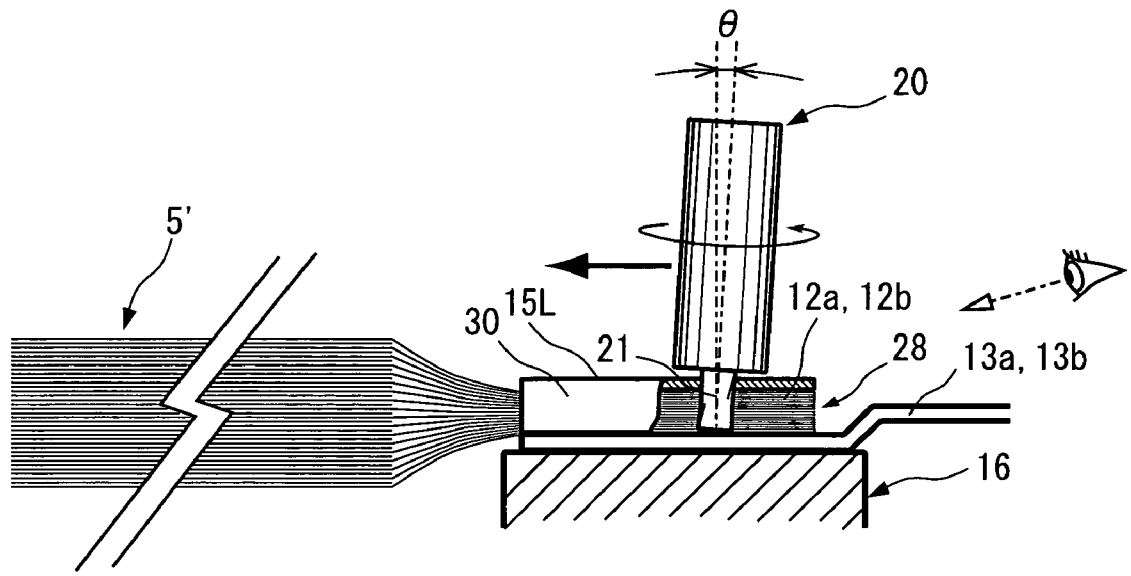
FIG. 8 is a view showing the state of carrying out the friction stir welding in the embodiment 2 of the present invention seen from the side.
Figure 10:
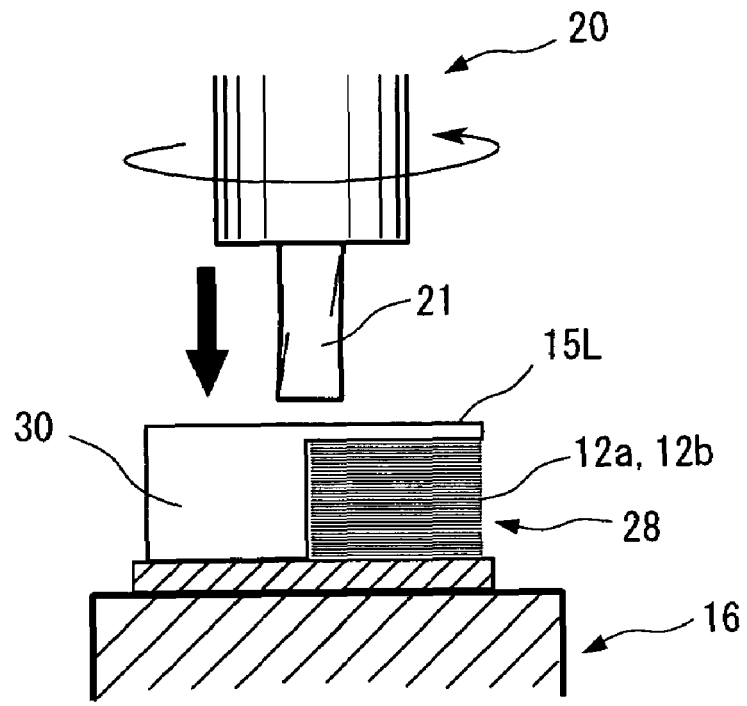
FIG. 10 are views showing the state of carrying out the friction stir welding in the embodiment 2 of the present invention seen from the viewpoint shown in FIG. 8.
Figure 10:
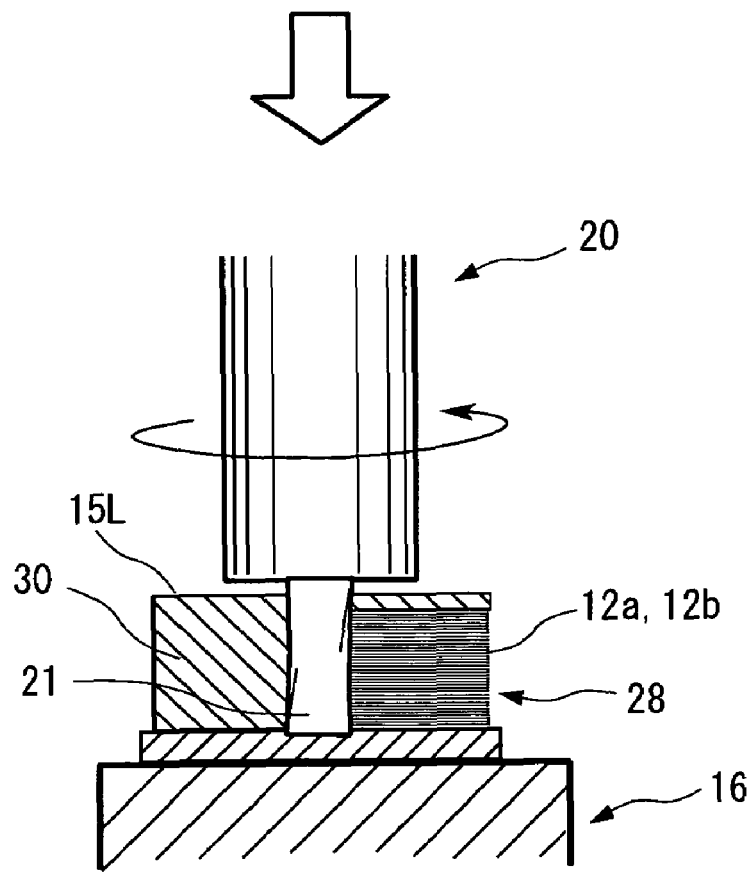

Each lead tab 12a of anode foils 7 and each lead tab 12b of cathode foil 8 of the above-mentioned capacitor element 5' formed by stacking are bundled together with respect to lead tabs 12a and lead tabs 12b to be a multilayer body 28. Then, reinforcing plate 15L of an L-shape in a sectional view as a reinforcing welding base material comprising a block part 30 that is a block body is positioned such that the above-mentioned block part 30 is abutted to the side face in a longitudinal direction of multilayer body 28 where lead tabs 12a or 12b are combined, and multilayer body 28 is closely housed inside of the L-shape almost without leaving a space between reinforcing plate 15L and the top face of multilayer body 28 as shown in FIG. 8 or FIG. 10 seen from the viewpoint shown in FIG. 8.

In addition, it is preferable that this reinforcing plate 15L of an L-shape in a sectional view as the reinforcing welding base material does not comprise the oxide layer formed by the formation process or a natural oxide layer. However, minute amount of the above-mentioned layer may be comprised as long as it does not generate a defect in the friction stir welding.

Figure 9:
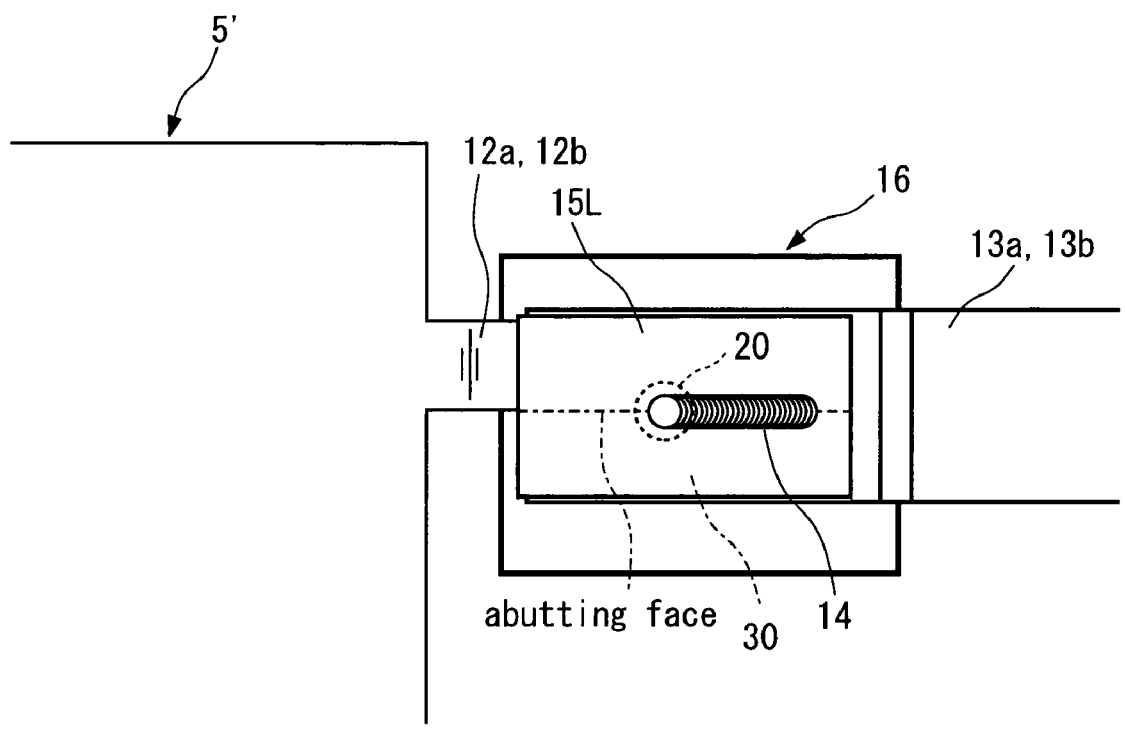
FIG. 9 is a view showing the state of carrying out the friction stir welding in the embodiment 2 of the present invention seen from the above.

Then, internal electrode 13a or 13b is laid abutting the bottom faces of multilayer body 28 and the above-mentioned block part 30 opposite to the face where the above-mentioned reinforcing plate 15L of multilayer body 28 is positioned. Lead tabs 12a or lead tabs 12b are sandwiched between said internal electrode 13a or 13b, and reinforcing plate 15L. At the same time, the above-mentioned block part 30 and multilayer body 28 are fixed by the fixing tape that is not shown in the figure almost without leaving a space therebetween. After that, probe 21 set at the head of stir rod 20 rotating from the back side of the above-mentioned reinforcing plate 15L on processing table 16 is press-fitted into almost the same direction as the stacking direction of said multilayer body on the boundary face of the above-mentioned block part 30 and multilayer body 28 into a predetermined depth as shown in FIGS. 8 and 10. Said press-fitted probe 21 is moved along the abutting face to carry out the friction stir welding as shown in FIG. 9. Connected zone 14 that is to be the weld zone is thereby formed, and reinforcing plate 15L(including block part 30), lead tabs 12a or 12b, and internal electrode 13a or 13b are electromechanically jointed. In addition, although the friction stir welding is carried out by press-fitting and moving the probe in the present embodiment 2, it may be also carried out by press-fitting the probe, rotating it for a given length of time, and thereafter pulling it out.

In this friction stir welding, the above-mentioned press-fitted probe 21 rotates to generate the friction heat and processing heat between reinforcing plate 15 and lead tabs 12a or 12b. Said friction heat and processing heat increase the temperature of aluminum that is the metal constituting reinforcing plate 15L, lead tabs 12a or 12b, and internal electrode 13a or 13b, to soften the aluminum. At the same time, said softened aluminum by the rotation of said probe 21 is stirred to thereby destroy the oxide layer on its surface. The base metals of the aluminum contact each other in a softened state, and get solidified at the back of said probe 21 with the movement of the probe. Thus, reinforcing plate 15L (including block part 30), lead tabs 12a or 12b, and internal electrode 13a or 13b are connected solidly.

In addition, because block part 30 of the above-mentioned reinforcing plate 15L and multilayer body 28 of lead tabs 12a or 12b are positioned adjacent to each other via probe 21 when the above-mentioned probe 21 is press-fitted in this friction stir welding, a sufficient amount of block part 30 not comprising the oxide layer, which is stirred and melted by the rotation of the cylindrical probe 21, is fed into the multilayer body well. Thus, it is possible to considerably decrease negative effects of the defect or the like generated by the oxide layer formed by the formation process, while more stable electromechanical connection can be obtained.

Capacitor element 5' with connected zone 14 formed by the friction stir welding by the above means is housed in the above-mentioned outer case 2 while internal electrodes 13a and 13b jointed with lead tabs 12a and 12b by the above-mentioned friction stir welding are respectively connected to external terminals 4, and thereafter, the aperture of said outer case 2 is hermetically sealed by sealing member 3 to be a capacitor as in the above-mentioned embodiment 1.

Figure 11:
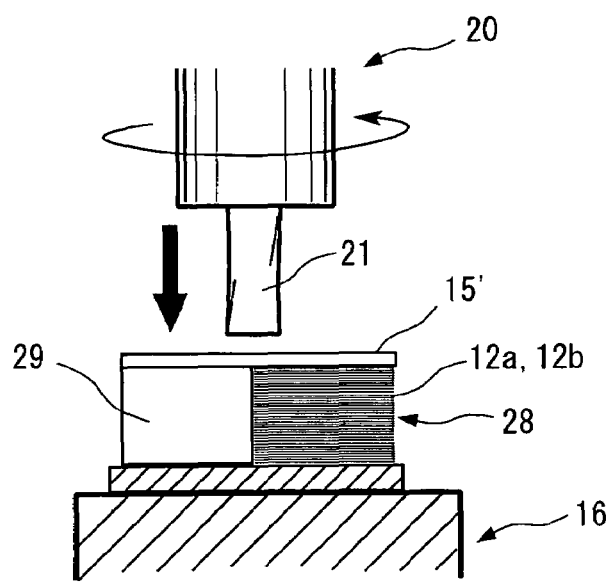
FIG. 11 is a view showing the state of carrying out another type of friction stir welding related to the embodiment 2 of the present invention seen from the same viewpoint as FIG. 10.

In addition, reinforcing plate 15L is of an L-shape comprising block part 30 at the end of its face, and the block body and reinforcing base material of the present invention are integrated therein in the present embodiment 2. This is preferable because the performance of the friction stir welding can be further improved since it becomes unnecessary to align the welding base material and reinforcing base material, and especially it becomes easy or unnecessary to maintain so as not to create a space between the welding base material and multilayer body 28 due to misalignment of the welding base material, and deterioration of the welding condition can be decreased as much as possible due to the space created between the welding base material and multilayer body 28. However, the present invention is not limited to this, and a block body 29 formed separately from reinforcing plate 15L may be applied as this block part 30 as shown in FIG. 11.

The height (thickness) of block part 30 or block body 29 may be almost the same height (thickness) as multilayer body 28 because, if the height is remarkably smaller than multilayer body 28, the positional stability of reinforcing plate 15L or a reinforcing plate 15' (see FIG. 11) gets worse due to a space created below block part 30 or above-mentioned block body 29 to thereby decrease the performance of the friction stir welding, lead tabs 12a or 12b stacked in multilayer body 28 in said space are not welded with block part 30 or block body 29 in a good condition, and enough welding strength between said block body 29 and reinforcing plate 15' may not be obtained when block body 29 is used.

Figure 12:
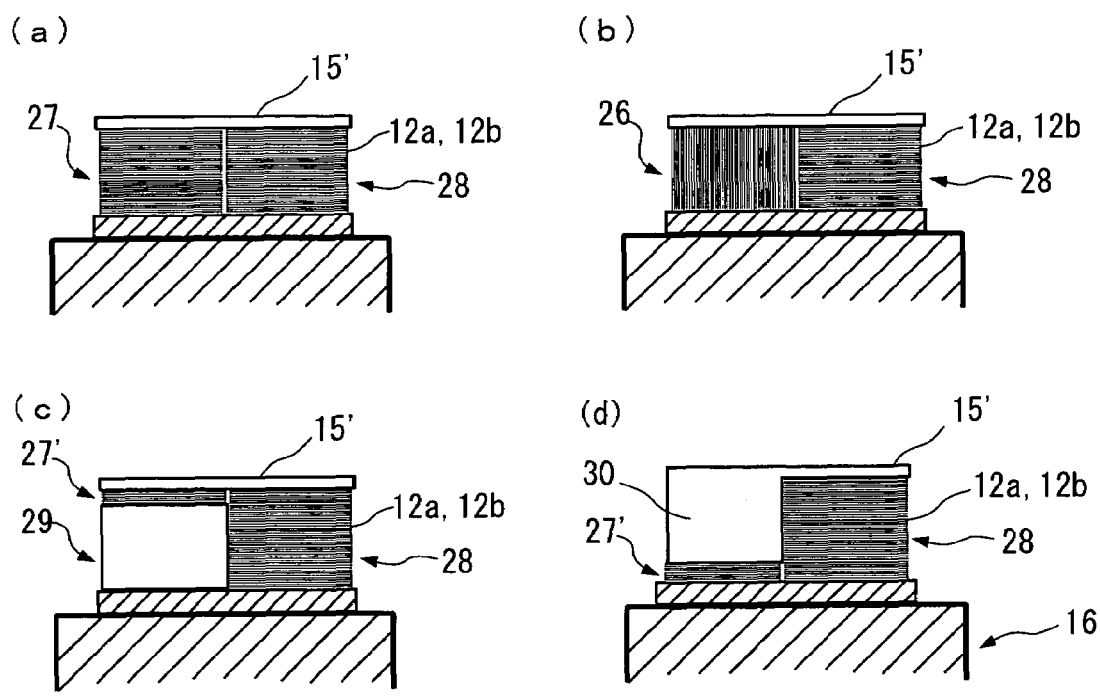
FIGS. 12(a) and (b) an embodiment with capacitors of the same height and FIGS. 12(c) and (d) an embodiment with capacitors of the differing heights are views showing the states of carrying out other types of friction stir welding related to the embodiment 2 of the present invention seen from the same viewpoint as FIG. 10.

In addition, using block part 30 or block body 29 is preferable because block part 30 or block body 29 is homogeneous in the stacking direction of multilayer body 28 and therefore has good heat conductivity, to thereby transfer the friction heat generated by friction with rotating probe 21 to the bottom side of weld zone 14 well, and this enables prevention of a variation in the welding quality due to defective heat transfer, while good heat conductivity or electrical conductivity can be obtained via non welded block part 30 or block body 29 because non welded block part 30 or block body 29 adjacent to weld zone 14, which is homogeneous in the stacking direction of multilayer body 28, remains. However, the present invention is not limited to this, and multilayer bodies for welding 26 and 27 where aluminum foils not comprising the oxide layers formed by the formation process are stacked to almost the same height (thickness) as the above-mentioned multilayer body 28 may be also used as the welding base material instead of these block part 30 and block body as shown in FIGS. 12(a) and (b). Here, the stacking direction of the multilayer bodies for welding may be in the same direction as multilayer body 28 as shown by multilayer body for welding 27 in FIG. 12(a). On the other hand, the direction may be in the direction perpendicular to multilayer body 28 as shown by multilayer body for welding 26 in FIG. 12(b).

In addition, when a multilayer body for welding comprised of the aluminum foils not comprising the oxide layers formed by the formation process is used as the welding base material, the welding base material of almost the same height (thickness) as multilayer body 28 can be easily obtained by setting a multilayer body for welding 27' comprised of a relatively small multilayer numbers of aluminum foils not comprising the oxide layers formed by the formation process below or above the above-mentioned block part 30 or block body 29 as a spacer to adjust the welding base material height, not by making all the welding base material to be the multilayer body for welding, in order to obtain the same thickness as the height (thickness) of multilayer body 28 which differs in its height (thickness) at each capacitor as shown in FIGS. 12(c) and (d). In addition, these multilayer bodies for welding 27' may be set between a plurality of block bodies 29 to be the welding base material. It is preferable that the multilayer body for welding comprised of metal foils as the welding base material does not comprise the oxide layer formed by the formation process or the natural oxide layer on its surface. However, minute amount of the above-mentioned layer may be comprised as long as it does not generate the defect in the friction stir welding.

Also, the friction stir welding is carried out by setting reinforcing plate 15L, and internal electrode 13a or 13b as the reinforcing base material in the present embodiment 2. This is preferable because lead tabs 12a or 12b, which are the stacked metal foils, are carried by or sandwiched between reinforcing plate 15L, and internal electrode 13a or 13b that are the reinforcing base material in the friction stir welding, to thereby improve the performance of the friction stir welding. However, the present invention is not limited to this, and the friction stir welding may be carried out by setting these reinforcing base materials only on one face of multilayer body 28, or not by setting these reinforcing base materials.

In addition, as the press-fitting direction of probe 21 that is a direction of carrying out the friction stir welding, reinforcing plate 15 is welded from its back side that is one part of the boundaries between block part 30 or block body 29 as the welding base material, and multilayer body 28 in the present embodiment 2. In other words, probe 21 is press-fitted into almost the same direction as the stacking direction of multilayer body 28. However, the present invention is not limited to this, and, for example, probe 21 may be press-fitted into the direction almost perpendicular to the stacking direction of multilayer body 28 at the face in the tip side of the direction of guiding out lead tabs 12a or 12b of multilayer body 28 as shown in FIG. 16, to carry out the friction stir welding on block part 30 or block body 29, and multilayer body 28. In addition, it is preferable to set the reinforcing plates on the top face and under the bottom face of multilayer body 28 in this case. It is also preferable to thicken said reinforcing plate at least more than the radius of the probe, because the probe does not run off the edge of the reinforcing plate when said probe is press-fitted from the boundary part around the end of the multilayer body and the end of said multilayer body can be welded. Further, by setting the reinforcing plate on the boundary part into which the above-mentioned probe 21 is press-fitted, in other words, by setting the reinforcing plate on the face in the tip side of the direction of guiding out lead tabs 12a or 12b of the above-mentioned multilayer body 28, and press-fitting and moving the probe, the friction stir welding can be carried out decreasing transformation or rupture of said lead tabs 12a and 12b due to said probe. Then, this probe 21 is press-fitted into the direction almost perpendicular to the stacking direction of multilayer body 28 to carry out the friction stir welding at the bottom of probe 21 which can weld over a wide area and form a stable weld zone. Also, each lead tab of multilayer body 28 can be likewise welded by the bottom of the probe, and the friction stir welding can be carried out with almost the same relative position of the press-fitting position of probe 21 against each connecting portion of the multilayer body. Thus, the welding quality of each lead tab stacked in the multilayer body can be almost equalized due to a positional difference within the welding probe 21. Further, the welding area can be reduced by keeping the press-fitting length and diameter of probe 21 to the minimum necessary to maintain rigidity, and also, the process can be simplified because it is not necessary to change the probe shape even if the thickness of the multilayer body is changed.

Figure 23:
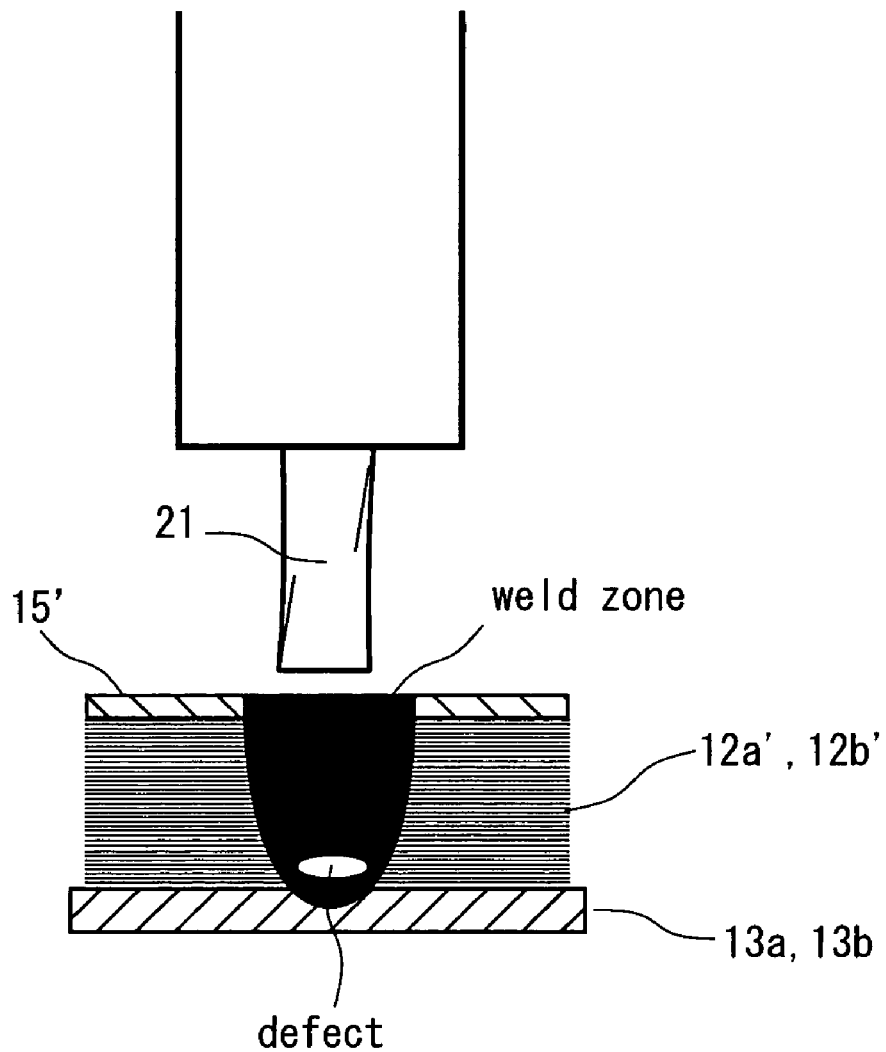
FIG. 23 is a view showing the formation condition of the weld zone and the defect by friction stir welding.

As described above, when the friction stir welding is carried out on the central part of said multilayer body 28 by simply sandwiching multilayer body 28 of lead tabs 12a' or 12b' between reinforcing plate 15' in the shape of a plate without block part 30, and internal electrode 13a or 13b as shown in FIG. 23, the defect is generated in the lower part of multilayer body 28 that is a distant part from probe 21 in the press-fitting direction in some cases as shown in FIG. 23, with an increase in the multilayer number of stacked lead tabs 12a' or 12b'. On the other hand, in accordance with the present embodiment 2, by using the capacitor comprising connection structure formed by the friction stir welding method described in the present embodiment, block body 30 is fed into the multilayer body by the rotation of probe 21 to decrease the amount of the oxide layer formed by the formation process, within the weld zone. Thus, the defect becomes difficult to generate in the lower part of multilayer body 28 even with the increase in the multilayer number of lead tabs 12a or 12b. Then, it becomes possible to provide the electrolytic capacitor comprising more stable electromechanical connection where the negative effects of the defect or the like generated by the oxide layer formed by the formation process are significantly decreased.

Embodiment 3

Figure 13:
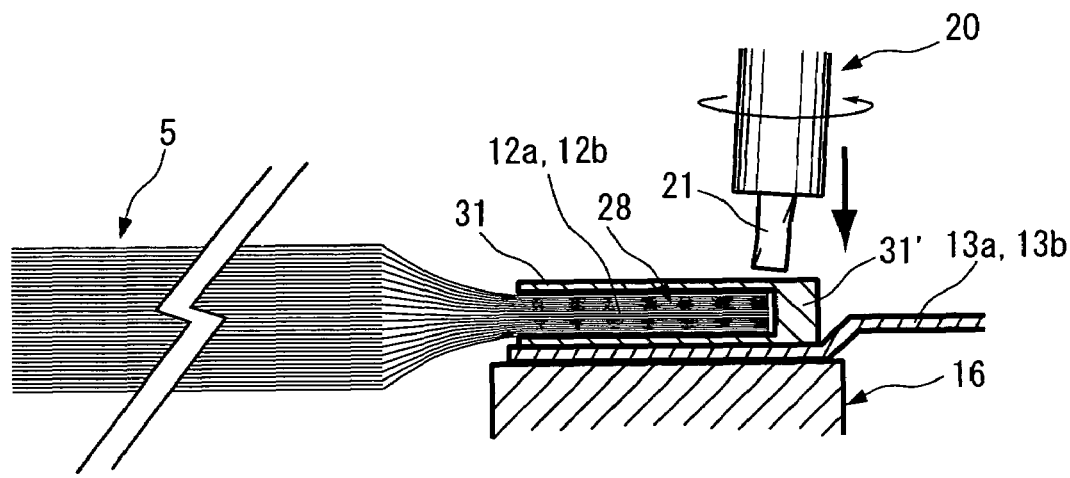
FIG. 13(a) is a view showing the state of carrying out the friction stir welding in the embodiment 3 of the present invention seen from the side and FIG. 13(b) is a view showing the state of carrying out the friction stir welding in the embodiment 3 of the present invention seen from the above.
Figure 13:
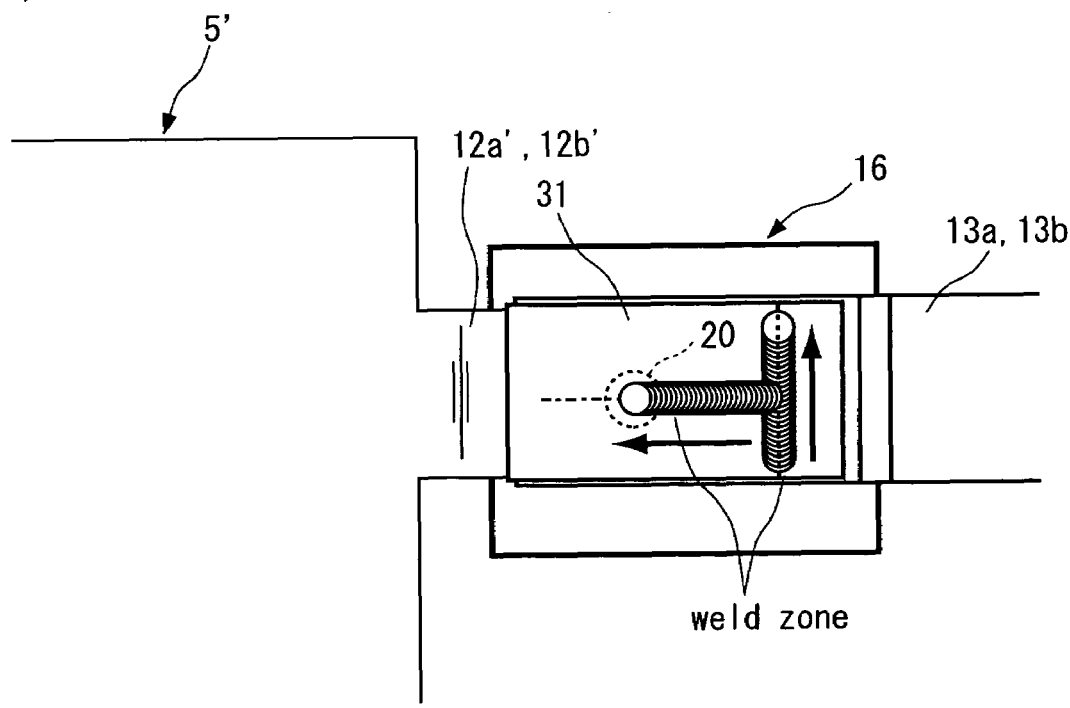

FIG. 13 are views showing the condition of carrying out the friction stir welding in the present embodiment 3. The present embodiment uses a reinforcing welding base material 31 of a U-shape in a sectional view comprising a block part 31' at the backend of lead tabs 12a or 12b, with both ends in upper and lower directions in a sectional view being opened, as shown in FIG. 13(a), instead of reinforcing base material 15L of an L-shape used in the above-mentioned embodiment 2.

This reinforcing welding base material 31, being of a U-shape, is easily attached to and tentatively jointed with multilayer body 28 by inserting and pressing multilayer body 28 into said U-shape.

After the above-mentioned tentative joint, internal electrode 13a or 13b is positioned on one face of said tentatively jointed reinforcing welding base material 31 (the bottom face in the present embodiment). Then, probe 21 is moved along the abutting face of block part 31' and multilayer body 28 to carry out the friction stir welding on processing table 16. At the same time, probe 21 is moved in the longitudinal direction of multilayer body 28 in its central part to carry out the friction stir welding to thereby form the weld zone of a T-shape, in order to obtain stronger mechanical strength or the like, as shown in FIG. 13(b).

Figure 14:
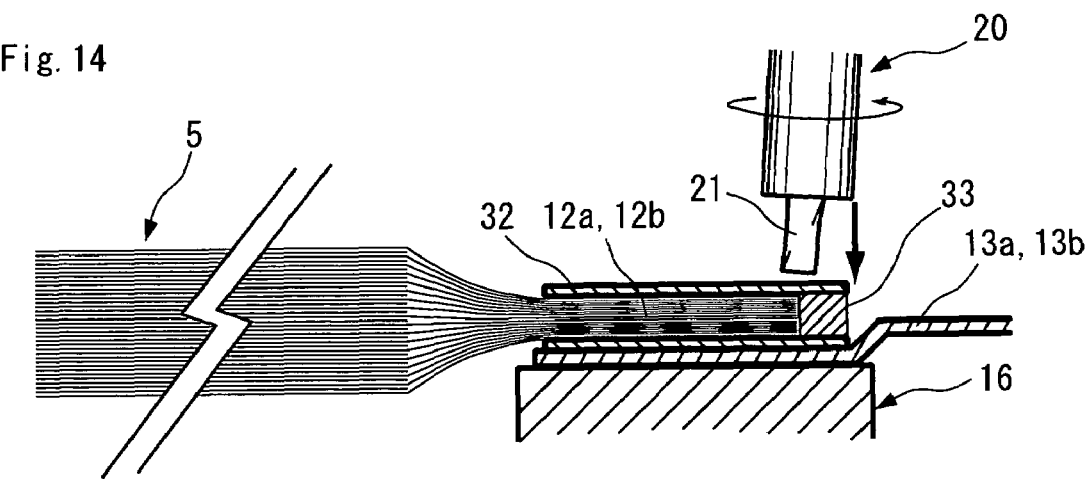
FIG. 14 is a view showing the state of carrying out another type of friction stir welding related to the embodiment 3 of the present invention seen from the side.

As described above, reinforcing welding base material 31 of a U-shape in a cross sectional view integrating block part 31' as the block body therein is used to tentatively joint reinforcing welding base material 31 and multilayer body 28 easily while friction stir welding activity can be significantly improved because block part 31' as the block body and multilayer body 28 do not get misaligned a lot in the present embodiment. However, a block body 33 formed separately from a reinforcing plate 32 may be applied as block part 31' as shown in FIG. 14 in the present embodiment like the above-mentioned embodiment 2. Multilayer body for welding 27, or block body 33 and multilayer body for welding 27' may also be applied as said block body 33 like the above-mentioned embodiment 2.

Figure 15:
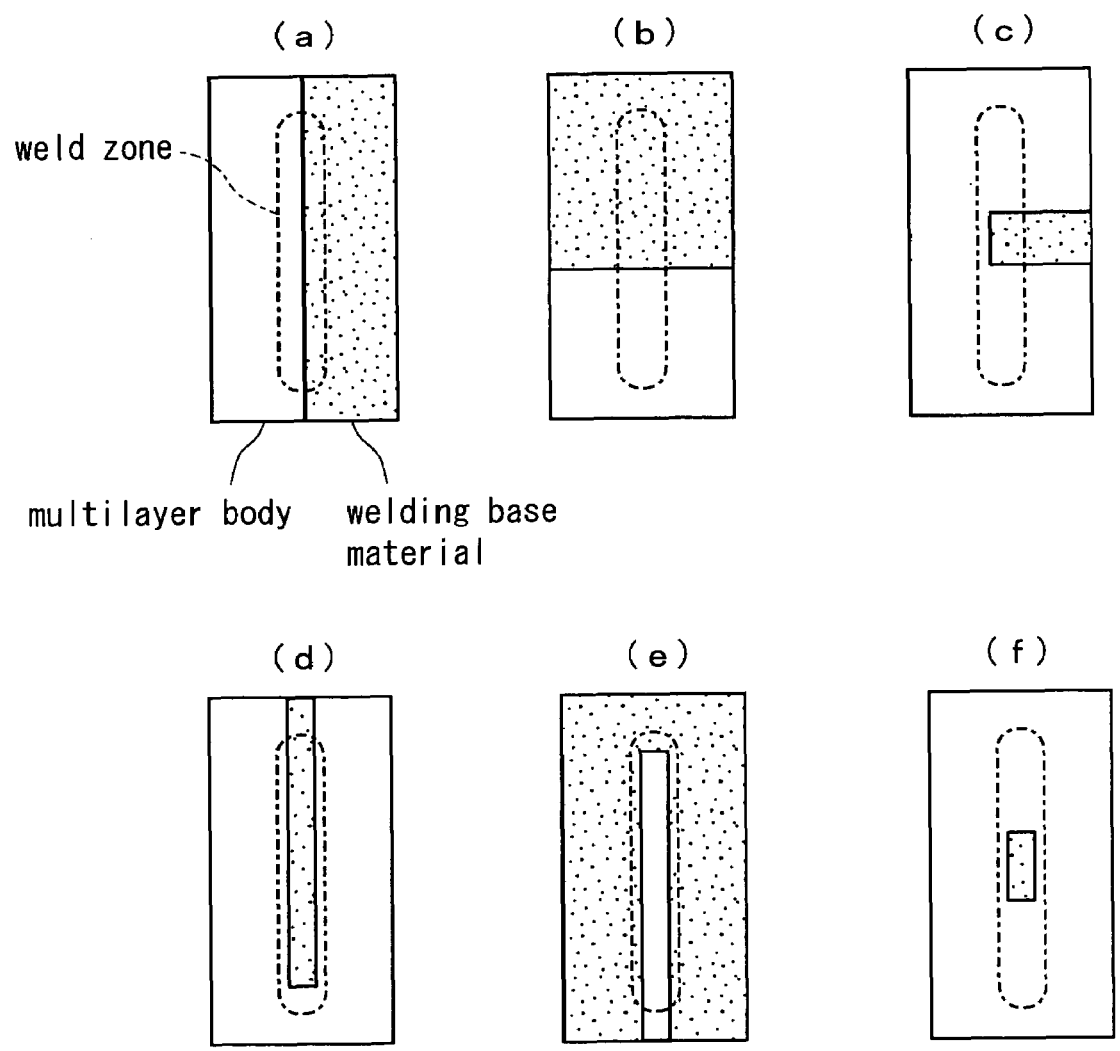
FIGS. 15(a) through (f) are views showing the configuration examples of other types of multilayer body and welding base material in the present invention.

In addition, as the examples of configuration—formation of the weld zone of multilayer body 28 and block body 29 that is the welding base material, or multilayer body 28 and block body 33 that is the welding base material for both the above-mentioned embodiment 2 and present embodiment 3, the weld zone of an I-shape, which is of a T-shape in the above-mentioned embodiment 2, may be formed in a manner that the abutting face of block body 33 and multilayer body 28 is traversed as shown in FIG. 15(b), in addition to the formation along the abutting face shown in FIG. 15(a).

Also, in each of the above-mentioned embodiments, the abutting faces of multilayer body 28 and block part 30, 31, or block part 29, 31' are only on one face of block part 30, 31 or block part 29, 31'. However, the present invention is not limited to this, and a block body may be positioned for offsetting along one side in almost the central part of the longitudinal direction of multilayer body 28 in a manner that three faces, a plurality of faces, are the abutting faces as shown in FIG. 15(c), a block body may be housed in a longitudinally-extending cut-away part at almost the central part of the short side of multilayer body 28 as shown in FIG. 15(d), or on the contrary, a block body may be positioned such that it surrounds three side faces of multilayer body 28 and the weld zone may be formed traversing one part of the abutting faces of multilayer body 28 and the block body as shown in FIG. 15(e). Further, a block body may be inserted and housed in a through hole formed in the central part of multilayer body 28 as shown in FIG. 15(f). In other words, at least one part of the boundaries between multilayer body 28 and the block body may be included within the welding range welded by probe 21 as described above. In addition, in the case of FIG. 15(f), the through hole may be a hole that does not penetrate multilayer body 28 thoroughly but nearly penetrates it, and said non penetrated part may be welded by the friction stir welding.

Embodiment 4

Subsequently, the present embodiment 4, which forms a cut-away part at lead tab 12a or 12b that is the connecting portion is explained.

First, cut-away parts 40 are formed by punching at lead tabs 12a or 12b as described in the embodiment 1 as shown in FIG. 17(a).

Then, lead tabs 12a or 12b comprising said cut-away parts 40 are sequentially stacked with a plate-like welding base material 35 comprising a concave part 36 that can be inserted into said cut-away parts 40 such that said concave part 36 is fit into said cut-away parts 40. In addition, the present embodiment 4 uses welding base material 35, plate part of which is about 1 mm in thickness, and concave part of which is about 2 mm in width. Although plate-like welding base material 35 comprising this concave part 36 is used here, this concave part may be separately formed.

As shown in FIG. 17(b), reinforcing plates 38 with a thickness of about 2 mm as the reinforcing base material are positioned abutting both end sides in the stacking direction of the multilayer body adherent to welding base material 35 by fitting into cut-away parts 40. After that, probe 21 with slightly smaller diameter than the above-mentioned concave part 36 with a width of 2 mm is press-fitted into the direction almost perpendicular to the stacking direction of said lead tabs 12a or 12b, running off the edge of concave part 36 so as not to make said probe 21 directly contact stacked lead tabs 12a or 12b as shown in FIG. 17(b). Then, probe 21 is moved in the longitudinal direction of concave part 36, i.e. the stacking direction of lead tabs 12a or 12b. Thus, the opposing two boundaries of cut-away parts 40 are welded mainly by the circumference of probe 21 at the same time, and each of the stacked lead tab 12a or 12b, welding base material 35 and reinforcing plates 38 are electromechanically connected. In addition, the above-mentioned diameter of probe 21, slightly smaller than 2 mm that is the width of the above-mentioned concave part, is employed because it can achieve solid connection by hardly generating any defect with the minimum welding range. However, the present invention is not limited to this, and a probe with the same as or bigger than the above-mentioned width of the above-mentioned concave part 36 may be used. Also, if the multilayer number of lead tabs 12a or 12b is small, it may be not necessary to move probe 21 in the stacking direction as stated above. In addition, it is preferable to press-fit the above-mentioned probe 21 into the direction almost perpendicular to the stacking direction of the above-mentioned lead tabs 12a or 12b in consideration of downsizing of the probe shape, reduction of the welding area, stabilization of the welding quality or the like. However, said probe 21 may be press-fitted into almost the same direction as the stacking direction of the above-mentioned lead tabs 12a or 12b.

In accordance with the present embodiment 4, lead tabs 12a or 12b can be stacked without aligning the stacking position. These welding base material 35 and multilayer body are well affixed and adherent to each other and it becomes possible to prevent misalignment of these welding base material 35 and multilayer body. Thus, the performance of the friction stir welding can be improved while said metal foils are sequentially stacked aligning cut-away parts 40 with the above-mentioned welding base material 35 to decrease the multilayer misalignment of lead tabs 12a or 12b that are the metal foils. Furthermore, even when lead tabs 12a or 12b are misaligned in stacking, lead tabs 12 or 12b can be abutted to one of the opposing faces of concave part 36 of welding base material 35 to carry out more reliable welding. Thus, the multilayer misalignment of lead tabs 12a or 12b in the stacking process can be allowed, and the defect generated by the multilayer misalignment can be reduced.

Figure 18:
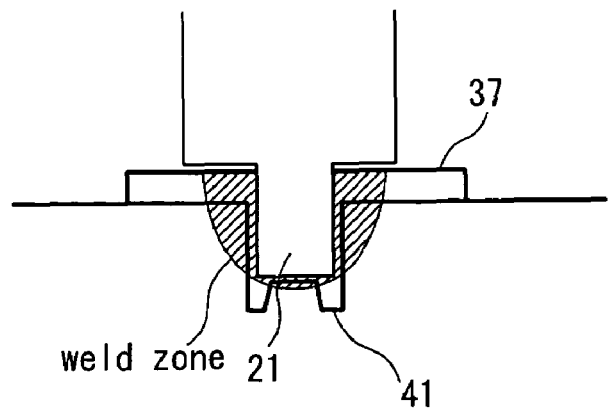
FIG. 18 is a view showing t the state of carrying out another type of friction stir welding related to the embodiment 4 of the present invention.

In addition, although cut-away parts 40 are formed at lead tabs 12a or 12b that are the metal foils in the present embodiment 4, the present invention is not limited to this. For example, by using a welding base material 37 with the tips formed on concave part 36 as shown in FIG. 18, and a cut-away part 41 corresponding to the protruding parts of said welding base material 37 instead of the above-mentioned cut-away part 40, the multilayer body is made to be positioned adjacent to the cut-away parts of the tips of said concave part 36 to thereby carry out the friction stir welding.

Further, cut-away parts 40 may not be formed at lead tabs 12a or 12b that are the metal foils, but a cut-away part may be formed only at the welding base material, and the multilayer body may be closely positioned inside of the cut-away part of said welding base material. Because this is as effective as when cut-away parts 40 are formed at lead tabs 12a or 12b, the cut-away part may be formed only at the welding base material.

Figure 21:
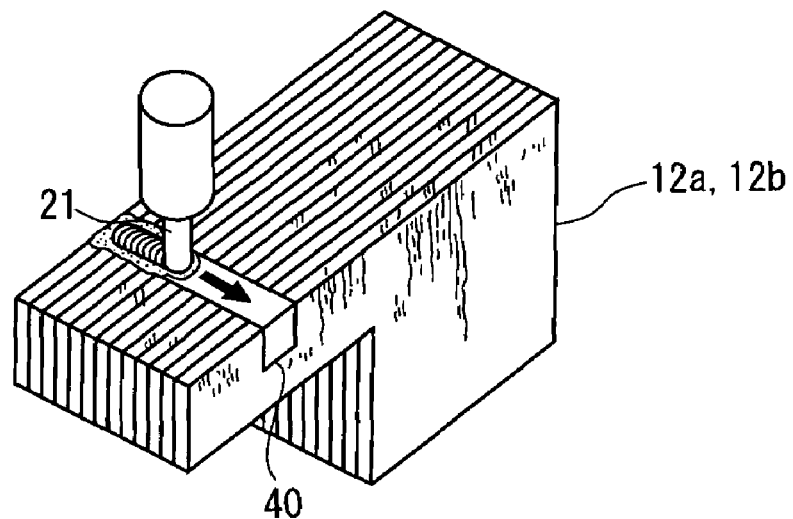
FIG. 21 is a view showing the state of carrying out another type of friction stir welding in the present invention.

In addition, although plate-like welding base material 35 comprising concave part 36 is used in the present embodiment 4, the present invention is not limited to this. For example, only the protruding part may be made to be the welding base material and housed in cut-away parts 40 to weld said welding base material as shown in FIG. 21.

In addition, although the width of cut-away parts 40 of lead tabs 12a or 12b is 2 mm, and probe 21 with slightly smaller diameter than said width is press-fitted to weld the opposing boundaries of cut-away parts 40 at the same time in the present embodiment 4, the present invention is not limited to this. The width of the above-mentioned cut-away parts 40 of lead tabs 12a or 12b may be narrow enough not to weld said opposing boundaries of cut-away parts 40 at the same time by one time press-fitting of probe 21, and probe 21 may be press-fitted respectively into the opposing boundary positions of cut-away parts 40 to separately weld the opposing boundaries of cut-away parts 40.

The present invention is hereinbefore described based on the figures, but it is not limited to the above-mentioned embodiments. It is obviously possible that the present invention includes change or addition within the scope of the present invention.

For example, although probe 21 is directly inserted into the boundary face of block body 29 and multilayer body 28 as shown in FIG. 11 in the embodiment 2, the present invention is not limited to this. Because the area around the circumference of probe 21 as the weld zone, processed with the friction stir welding, is also melted by friction heat, stirred and welded as shown in FIG. 23 and FIG. 17(b), the boundary face of block body 29 that is the welding base material, and multilayer body 28 may be positioned at the circumference of probe 21 within the area stirred and welded by probe 21, and also, the weld zone by probe 21 may be formed more in the block body 29 as shown in FIG. 19.

Figure 19:
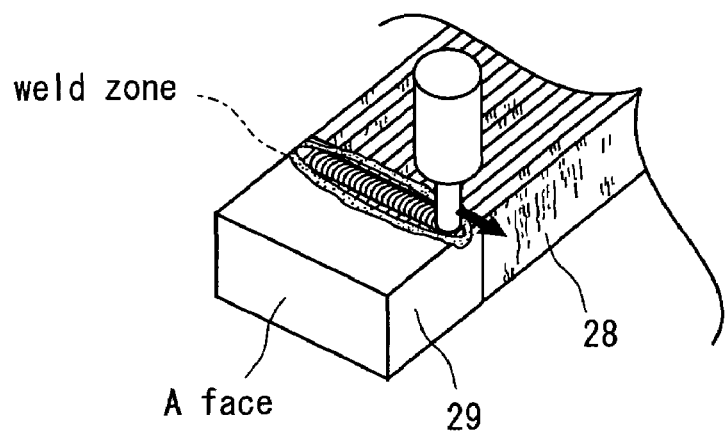
FIG. 19 is a view showing the state of carrying out another type of friction stir welding in the present invention.
Figure 20:
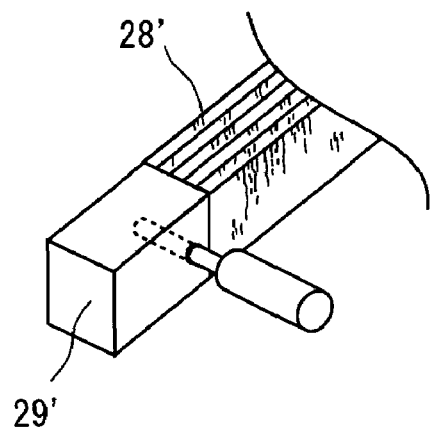
FIG. 20 is a view showing the state of carrying out another type of friction stir welding in the present invention.

In addition, probe 21 is press-fitted in the direction almost perpendicular to the stacking direction of multilayer body 28 and said press-fitted probe 21 is moved in almost the same direction as the stacking direction to carry out the friction stir welding as shown in FIG. 19. This is preferable because the size of the area of block body 29 stirred by the probe except the vicinity of the adjacent face can be reduced to a minimum compared with, for example, when the probe is press-fitted from the A face side of block body 29 to carry out the friction stir welding. However, the present invention is not limited to this. For example, when the number of lead tabs 12a or 12b that are the metal foils stacked in multilayer body 28' is small, lead tabs 12a or 12b stacked in multilayer body 28', and block body 29' that is the welding base material, may be integrated by the friction stir welding only by press-fitting (without moving) probe 21 into almost the same direction as the stacking direction of the above-mentioned multilayer body 28' as shown in FIG. 20, in addition to press-fitting probe 21 into the direction almost perpendicular to the stacking direction of this multilayer body 28, and moving said press-fitted probe 21 in almost the same direction as the stacking direction. In other words, the probe may be press-fitted along the boundary face of block body 29 or 29' that is the welding base material, and the above-mentioned multilayer body 28 or 28', or along the vicinity of said boundary such that said boundary face is included within the range of stir welding when press-fitting the probe.

Figure 22:
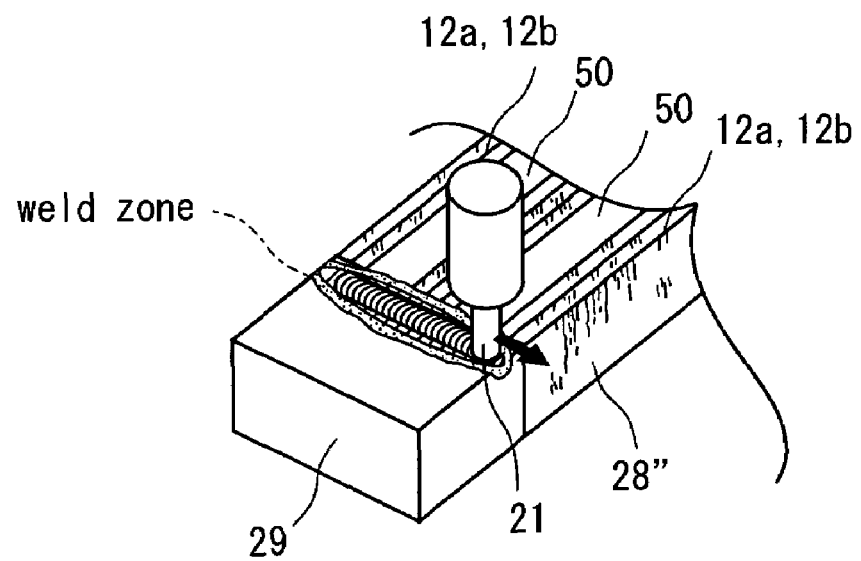
FIG. 22 is a view showing the state of carrying out another type of friction stir welding in the present invention.

In addition, although only the metal foils of lead tabs 12a or 12b are stacked in multilayer body 28 or 28' in the above-mentioned embodiments, the present invention is not limited to this. Reinforcing base plates 50 with bigger thickness than lead tab 12a or 12b may be interposed between said one part of stacked lead tabs 12a and 12b as shown by a multilayer body 28" in FIG. 22. By this, metal not comprising the oxide layer is fed into the weld zone from these reinforcing base plates 50, and thus, the absolute amount of the oxide layer within the weld zone can be further decreased while the defect generated by the existence of the oxide layer can be further reduced and probe wear can be also decreased. Moreover, it becomes possible to prevent the stacking condition of the metal foils stacked in the above-mentioned multilayer body 28" from being destroyed (disturbed) by welding. The performance of the friction stir welding can be further improved while the obtained mechanical joint strength of the multilayer body can be increased to thereby increase reliability of connectivity.

In addition, the welding base material and the reinforcing base material not comprising the oxide layers formed by the formation process or the natural oxide layers on their surfaces are used in the above-mentioned embodiments. It is preferable that the welding base material and the reinforcing base material do not comprise the above-mentioned layers on their surfaces at least in the areas stirred and welded by press-fitting the probe. Thus, if outside of the above-mentioned welded area, the above-mentioned layer may be formed. Also, even within the above-mentioned welded area, minute amount of the above-mentioned layer may be comprised as long as it does not generate the defect in carrying out the friction stir welding.

In addition, although the present embodiments are explained using the normal multilayer electrolytic capacitor, the present invention is not limited to this. It is obviously possible to apply to the present invention an electrical double layer capacitor comprising a polarizable electrode foil where activated charcoal sheets that are to be polarizable electrode layers made primarily of activated charcoal or carbon, are attached on both sides of the aluminum foils of the above-mentioned anode foils 7 and cathode foils 8. When this electrical double layer capacitor is used, metal having good electron conductivity but not having valve action, such as iron, copper or the like, may be also used as the metal foil instead of aluminum, tantalum and titanium that are the above-mentioned valve-action metal.

In addition, although the above-mentioned embodiments use the example that lead tabs 12a or 12b comprise the oxide layers formed by the formation process, the present invention is not limited to this. Lead tabs 12a or 12b may be made not to comprise the oxide layers formed by the formation process by masking the regions that are to be lead tabs 12a or 12b in punching, removing the oxide layers, or the like. Thus, the absolute amount of the oxide layer within the weld zone may be further decreased to thereby further reduce the defect generated by the existence of this oxide layer.

Also, in the case of the electric double layer capacitor, the friction stir welding is carried out on lead tabs 12a or 12b comprising the polarizable electrode layers made primarily of activated charcoal or carbon. The polarizable electrode layers in the connecting portions are stirred by the press-fitting and movement of probe 21, and each aluminum foil that is the base metal is welded together. However, not by providing lead tabs 12a or 12b with the polarizable electrode layers, the defect generated by the activated charcoal or carbon included in these polarizable electrode layers, like by the oxide layers, may be avoided to obtain a stable connection quality.

In addition, although the above-mentioned embodiments are explained by using the electrolytic capacitor of relatively large size, the present invention is not limited to this. The method for manufacturing multilayer capacitor may be applied to the manufacture of a chip-type solid electrolytic capacitor. In addition to this, it may be also applied to welding of positive or negative metal foils for cell, especially fuel cell or the like.

In addition, although internal electrode 13a or 13b is formed separately from welding reinforcing base material 31 in the above-mentioned embodiments, the present invention is not limited to this. These reinforcing welding base material 31, and internal electrode 13a or 13b may be integrated.

In addition, probe 21 is press-fitted from the back side of reinforcing plates 15, 15L and 15' that are the reinforcing base materials to carry out the friction stir welding in the above-mentioned embodiments. This is preferable because reinforcing plate 15, 15L, or 15' exists between lead tabs 12a or 12b that are the bundled and stacked connecting portions, and the rotating probe for carrying out the friction stir welding to thereby considerably prevent a problem due to transformation or rupture of the top of bundled and stacked lead tabs 12a or 12b by the rotation of probe 21 from occurring. However, the present invention is not limited to this, and this friction stir welding may be carried out from the side where reinforcing plate 15, 15L or 15', and internal electrode 13a or 13b are not formed.

The invention claimed is:

1. A method for manufacturing a multilayer capacitor comprising a capacitor element housed in an outer case, the capacitor element being comprised of a plurality of metal foils alternately stacked with electrically insulating separators interposed therebetween, the metal foils partly comprising connecting portions without said electrically insulating separators interposed therebetween; and the connecting portions connected respectively to a positive electrode external terminal and a negative electrode external terminal; comprising the step of:

electromechanically connecting and combining each connecting portion of each stacked metal foil by friction stir welding, wherein a reinforcing base material is placed at least one side of each of the stacked connecting portions to carry out the friction stir welding of the connecting portions.

2. The method for manufacturing a multilayer capacitor of claim 1, wherein the reinforcing base material works as an internal electrode.

3. The method for manufacturing a multilayer capacitor of claim 1, wherein the friction stir welding is carried out from the side where the reinforcing base material is placed.

4. The method for manufacturing a multilayer capacitor of claim 1, wherein a same metal material as the metal foils is used as the reinforcing base material.

5. A method for manufacturing a multilayer capacitor comprising a capacitor element housed in an outer case, the capacitor element being comprised of a plurality of metal foils alternately stacked with electrically insulating separators interposed therebetween, the metal foils partly comprising connecting portions without said electrically insulating separators interposed therebetween; and the connecting portions connected respectively to a positive electrode external terminal and a negative electrode external terminal; comprising the step of:

electromechanically connecting and combining each connecting portion of each stacked metal foil by friction stir welding.

wherein a welding base material, made of a same metal as the metal foils and having almost a same thickness as or being thicker than multilayer bodies formed by stacking the metal foils comprising the connecting portions, is positioned adjacent to at least one part of a stacking side face of each of the multilayer bodies, and at least one part of a boundary between the welding base material and the multilayer body is stirred by a rotating probe to form a weld zone.

6. The method for manufacturing a multilayer capacitor of claim 5, wherein the probe is press-fitted into the boundary between the welding base material and the multilayer body, or vicinity of the boundary, along a boundary face.

7. The method for manufacturing a multilayer capacitor of claim 5, wherein the welding base material comprises at least an almost homogeneous block body made of the same metal as the metal foils stacked in the multilayer body.

8. The method for manufacturing a multilayer capacitor of claim 5, wherein the welding base material comprises at least a multilayer body of metal foils not comprising oxide layers formed by a formation process on their surfaces.

9. The method for manufacturing a multilayer capacitor of claim 5, wherein the welding base material is positioned adjacent to a cut-away part formed in a circumference of the multilayer body, or an internal surface of a hole penetrated in a stacking direction such that almost all the metal foils stacked in the multilayer body are penetrated.

10. The method for manufacturing a multilayer capacitor of claim 9, wherein the probe is shaped such that the probe rotates to weld at least one part of opposing boundaries out of boundaries between the welding base material positioned adjacent to the cut-away part or the internal surface of the hole, and the multilayer body, at the same time.

11. The method for manufacturing a multilayer capacitor of claim 5, wherein the multilayer body is positioned adjacent to an internal surface of a cut-away part formed at the welding base material.

12. The method for manufacturing a multilayer capacitor of claim 5, wherein the probe is press-fitted such that the weld zone welded by the probe is formed more in a welding base material side.

13. The method for manufacturing a multilayer capacitor of claim 5, wherein the probe is press-fitted into almost a same direction as the stacking direction of the multilayer body.

14. The method for manufacturing a multilayer capacitor of claim 5, wherein the probe is press-fitted into a direction almost perpendicular to the stacking direction of the multilayer body.

15. The method for manufacturing a multilayer capacitor of claim 5, wherein a reinforcing base material made of the same metal as the metal foils and being thicker than the metal foil is positioned abutting the multilayer body, and one part of the reinforcing base material is welded with the multilayer body by the friction stir welding.

16. The method for manufacturing a multilayer capacitor of claim 15, wherein the welding base material and the reinforcing base material are integrated.

17. The method for manufacturing a multilayer capacitor of claim 16, wherein a reinforcing welding base material integrating the welding base material and the reinforcing base material is of an L-shape in a sectional view, or of a U-shape, with at least. one side opened. in a sectional view.

18. The method for manufacturing a multilayer capacitor of claim 5, wherein the reinforcing base material being thicker than the metal foil is interposed between one part of the metal foils stacked in the multilayer body.

19. The method for manufacturing a multilayer capacitor of claim 5, wherein the metal foils comprise the oxide layers formed by the formation process, or polarizable electrode layers made primarily of activated charcoal or carbon, on their surfaces at least except the connecting portions.

20. The method for manufacturing a multilayer capacitor of claim 1, wherein a welding base material, made of a same metal as the metal foils and having almost a same thickness as or being thicker than multilayer bodies formed by stacking the metal foils comprising the connecting portions, is positioned adjacent to at least one part of a stacking side face of each of the multilayer bodies, and at least one part of a boundary between the welding base material and the multi layer body is stirred by a rotating probe to form a weld zone.

* * * * *